(12) United States Patent
Harris et al.

(10) Patent No.: US 7,679,757 B1
(45) Date of Patent: Mar. 16, 2010

(54) NON-CONTACT PROFILE MEASUREMENT SYSTEM

(75) Inventors: Michael Harris, Columbus, GA (US); Andy Hidle, Columbus, GA (US); Ben Burdette, Columbus, GA (US)

(73) Assignee: BYTEWISE Measurement Systems LLC., Columbus, GA (US)

( * ) Notice: Subject to any disclaimer, the term of this patent is extended or adjusted under 35 U.S.C. 154(b) by 1253 days.

(21) Appl. No.: 10/699,522

(22) Filed: Oct. 31, 2003

Related U.S. Application Data

(60) Provisional application No. 60/422,765, filed on Oct. 31, 2002.

(51) Int. Cl.
*G01B 11/30* (2006.01)

(52) U.S. Cl. .................................................. 356/602
(58) Field of Classification Search ............... None
See application file for complete search history.

(56) References Cited

U.S. PATENT DOCUMENTS

| | | | | |
|---|---|---|---|---|
| 6,205,240 B1 * | 3/2001 | Pietrzak et al. | ............. | 382/152 |
| 6,909,513 B1 * | 6/2005 | Fujita et al. | ................ | 356/601 |

\* cited by examiner

*Primary Examiner*—Tu T Nguyen

(57) ABSTRACT

A non contact measurement system for in-process measurement of a work piece to is described. There is provided a sensor chassis that includes one or more contour sensors for capturing the profile of a work piece and outputting coordinate values describing one or more points representative of the profile of the work piece.

32 Claims, 29 Drawing Sheets

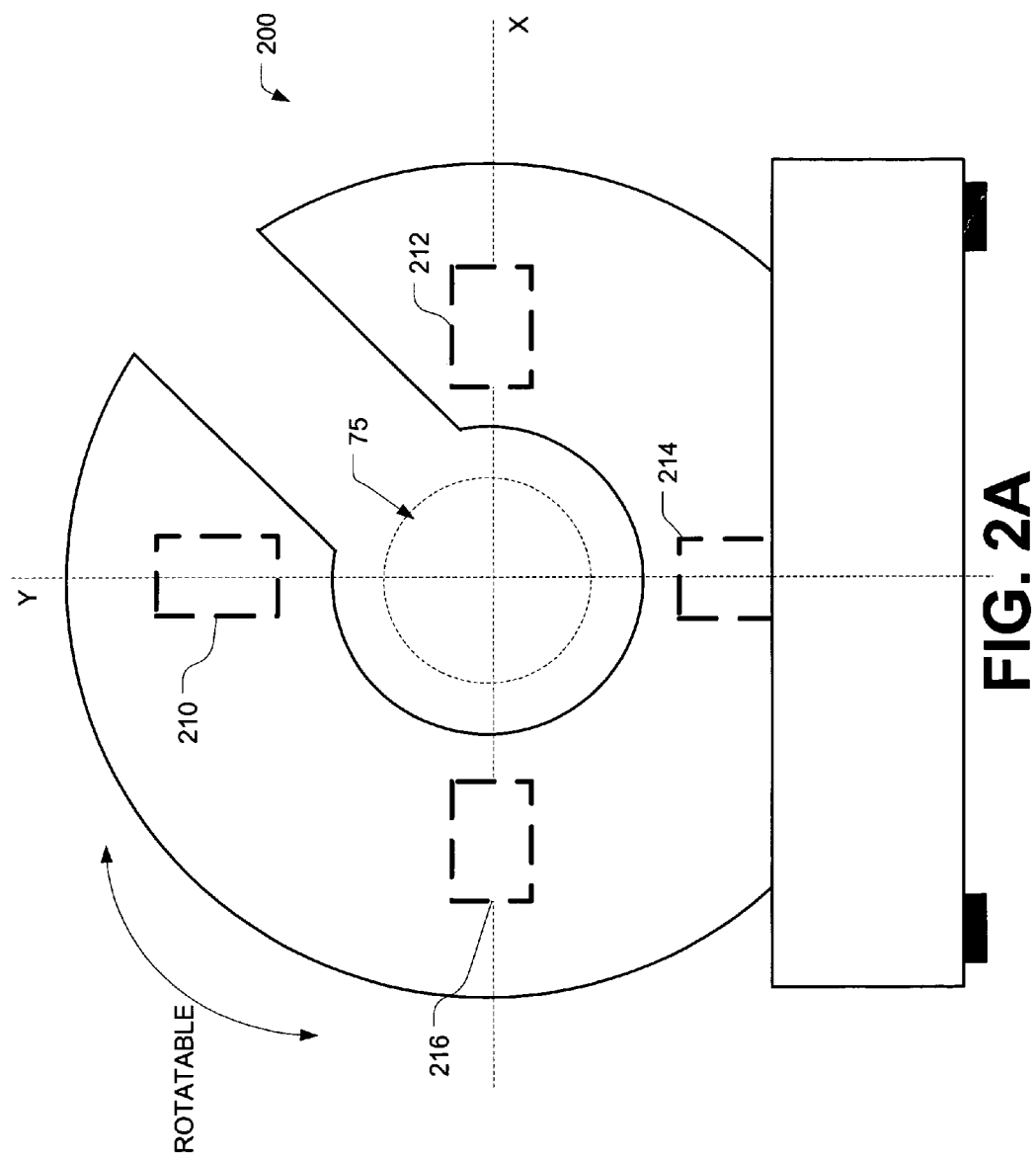

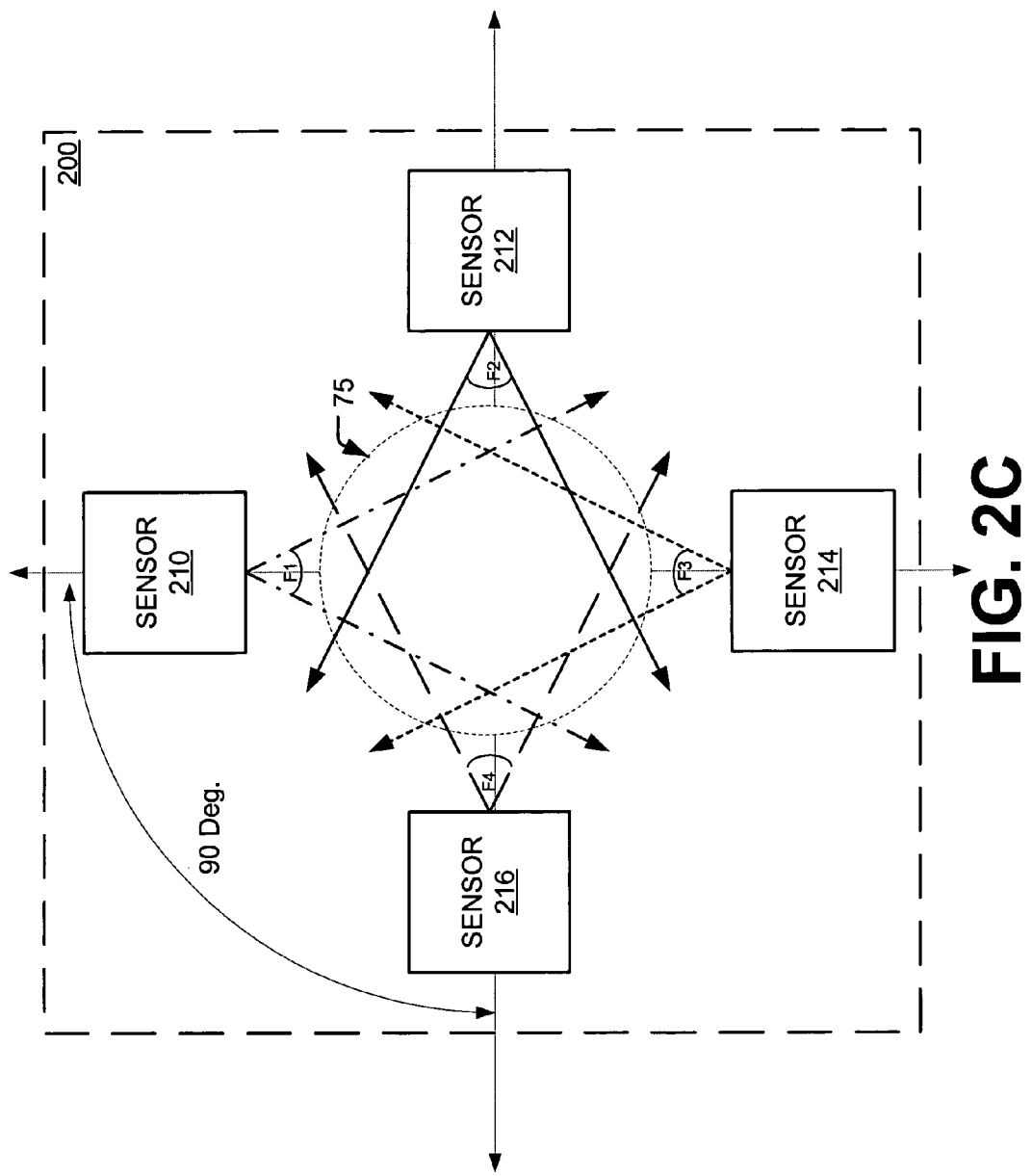

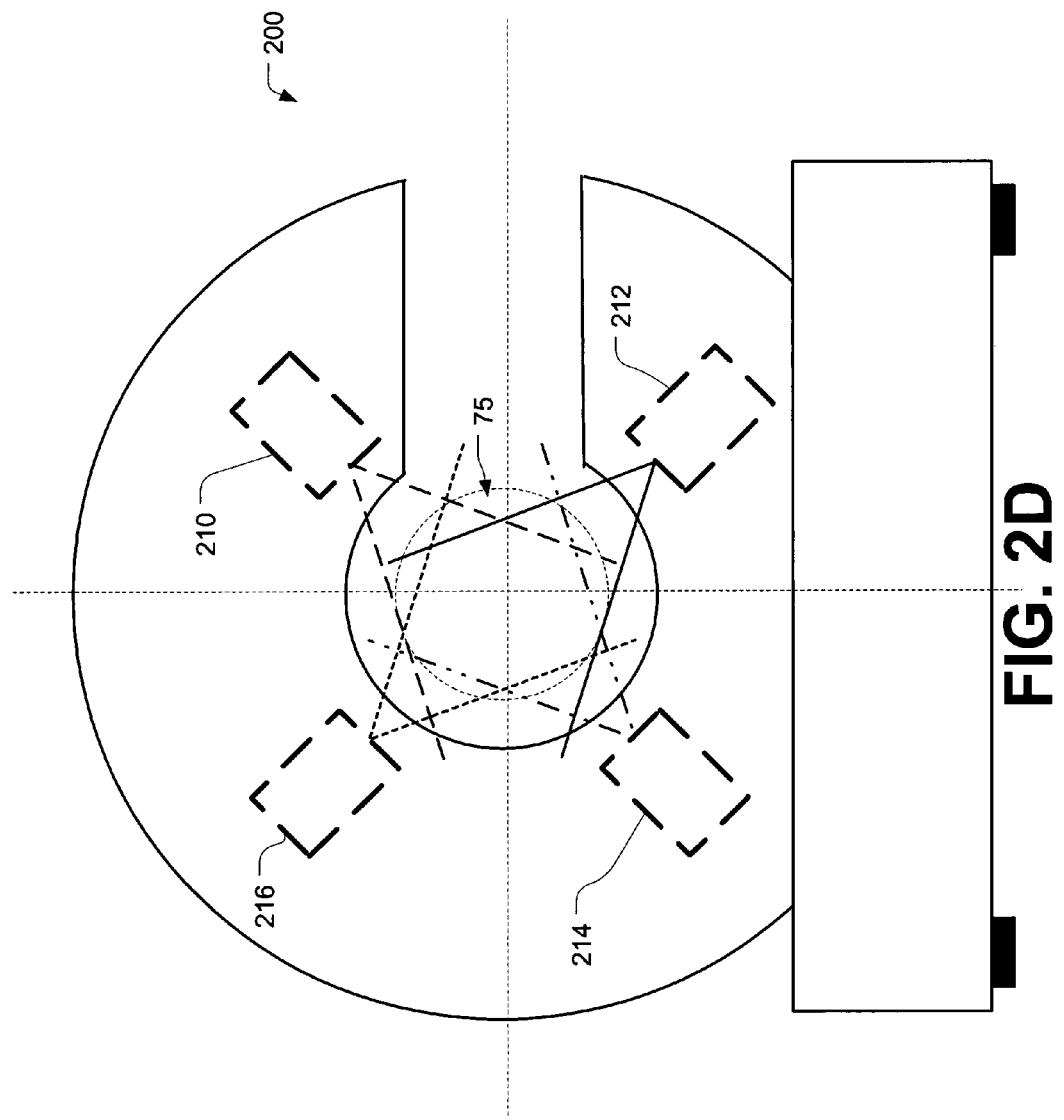

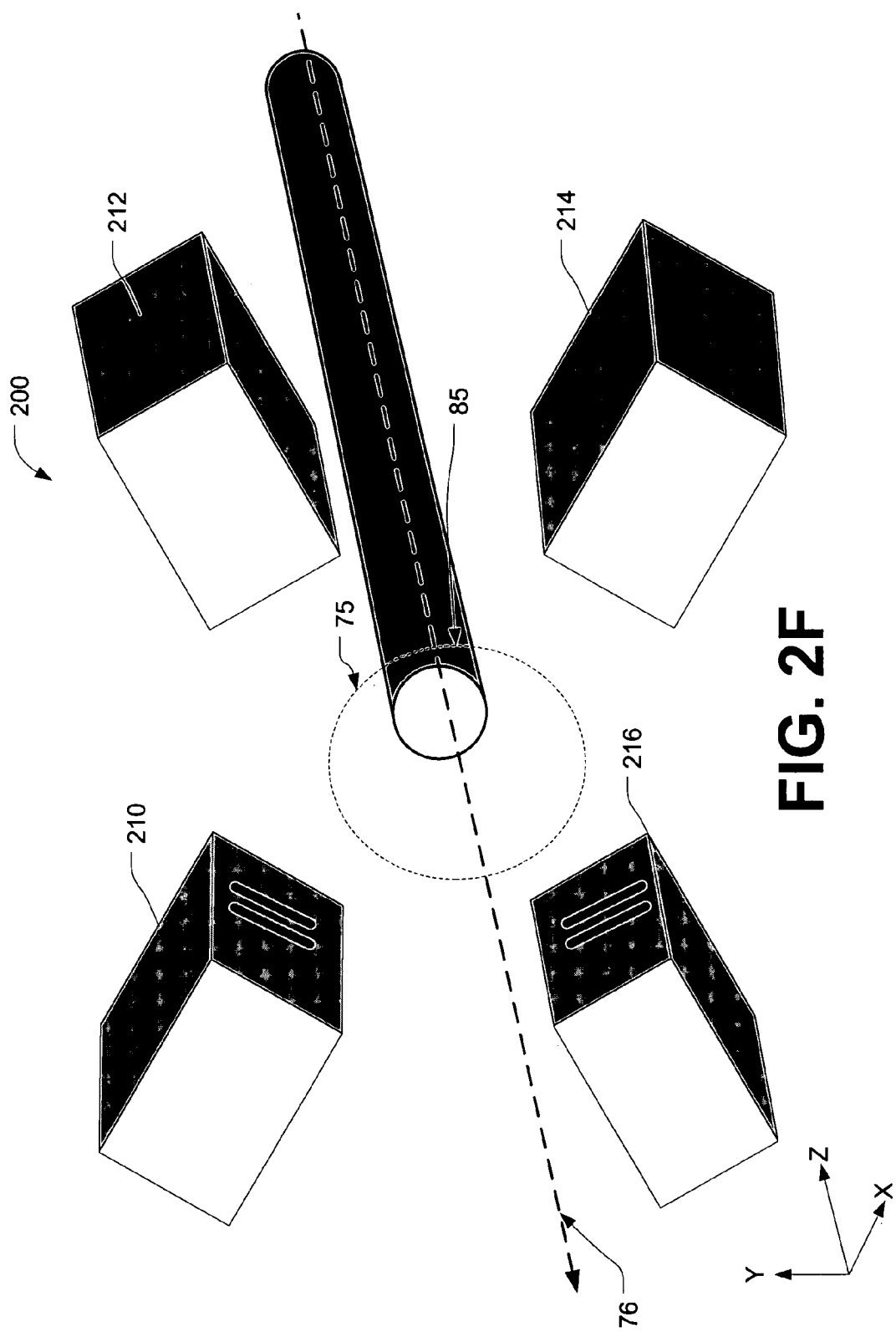

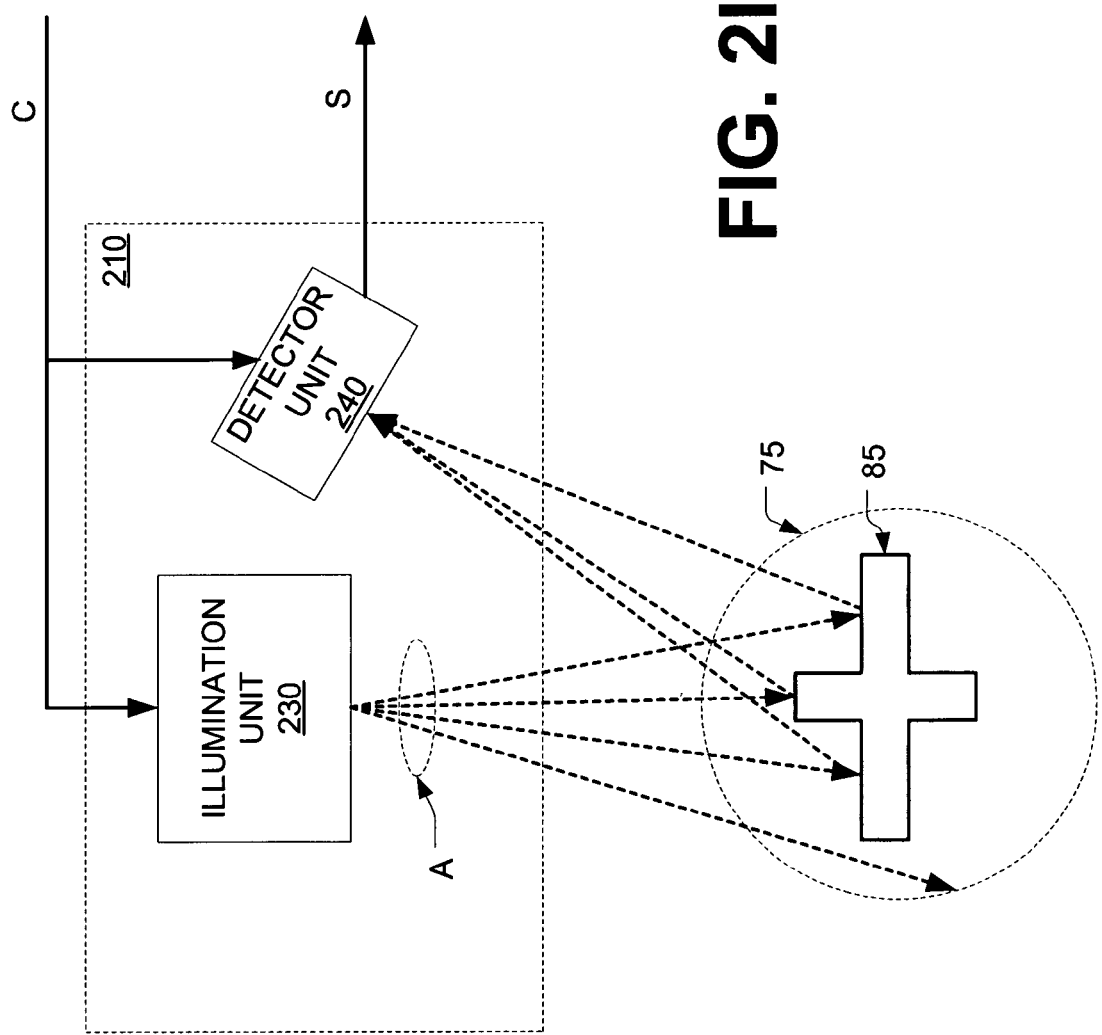

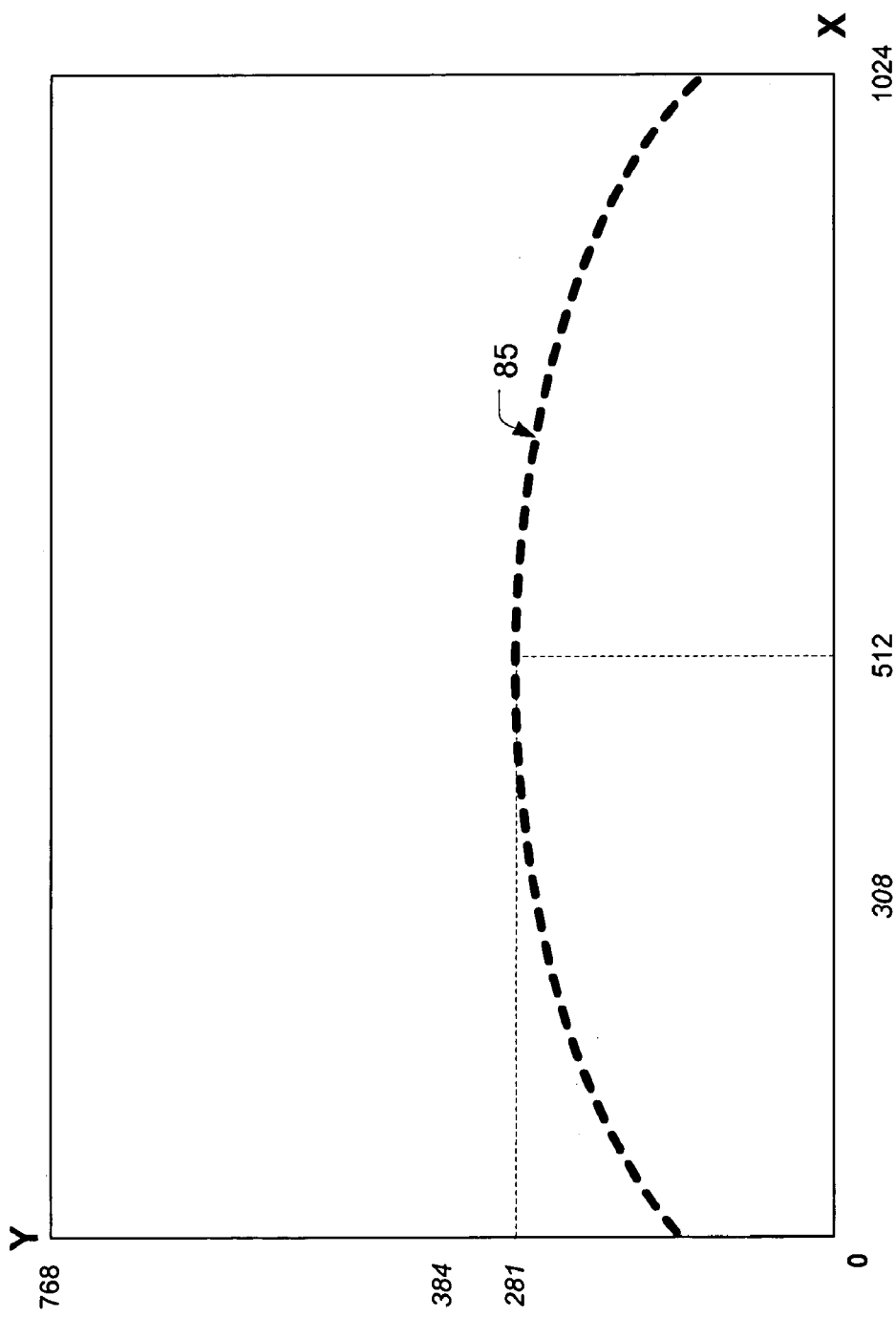

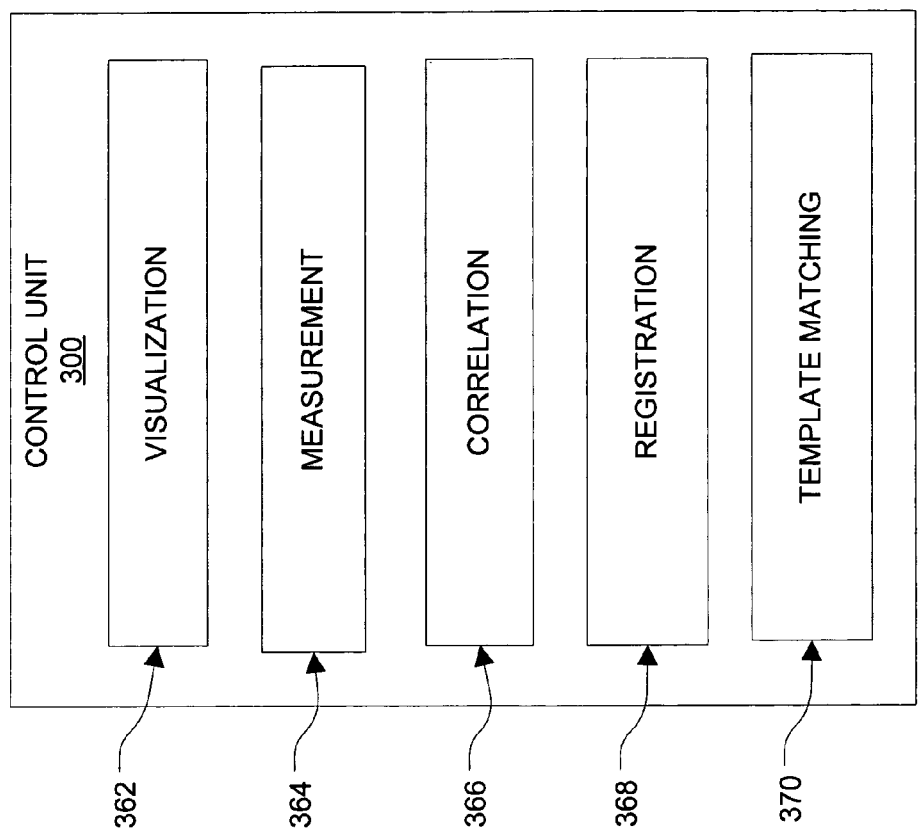

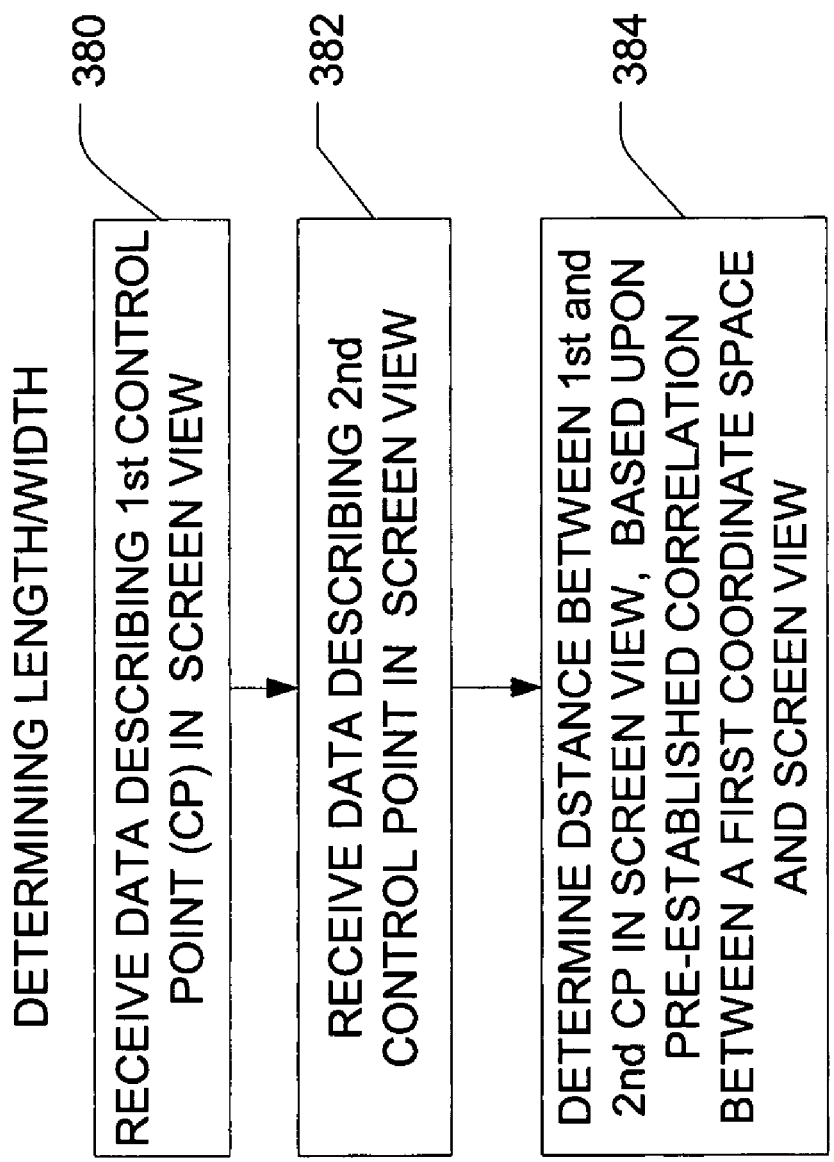

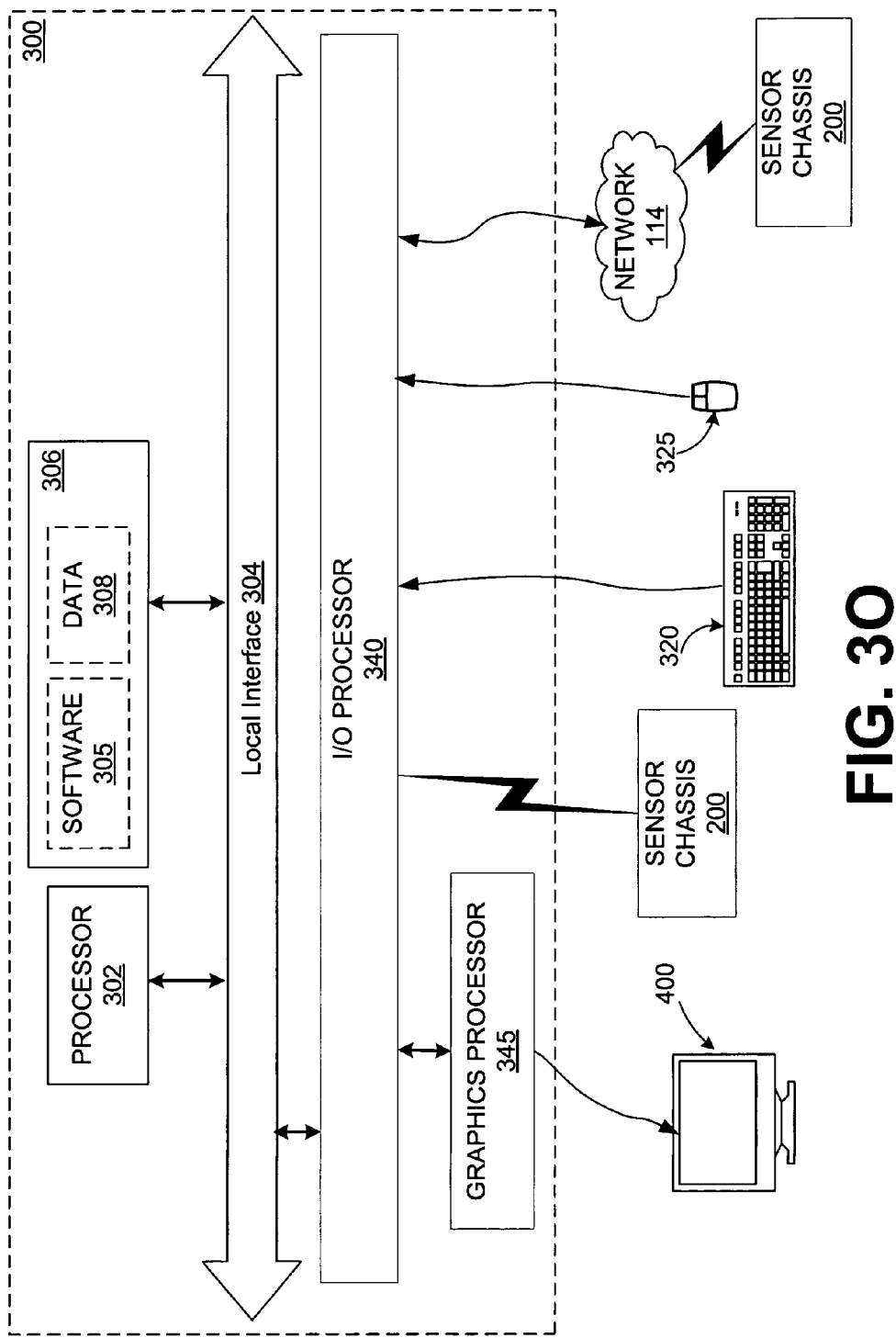

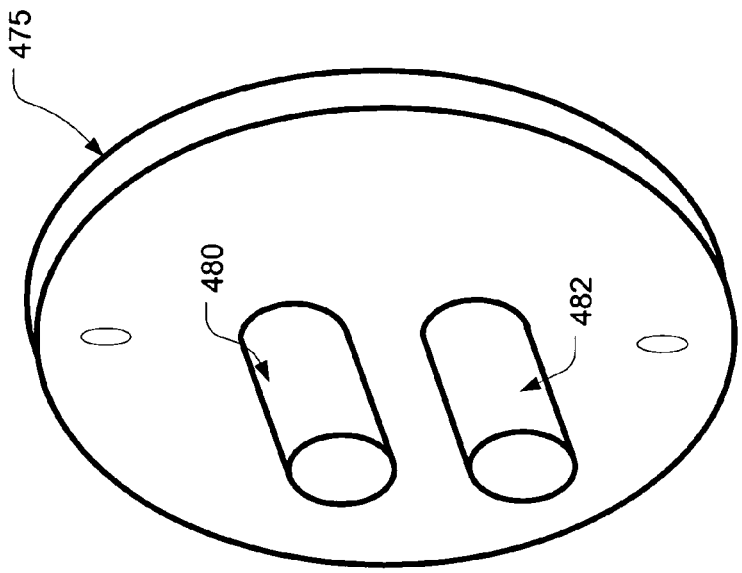
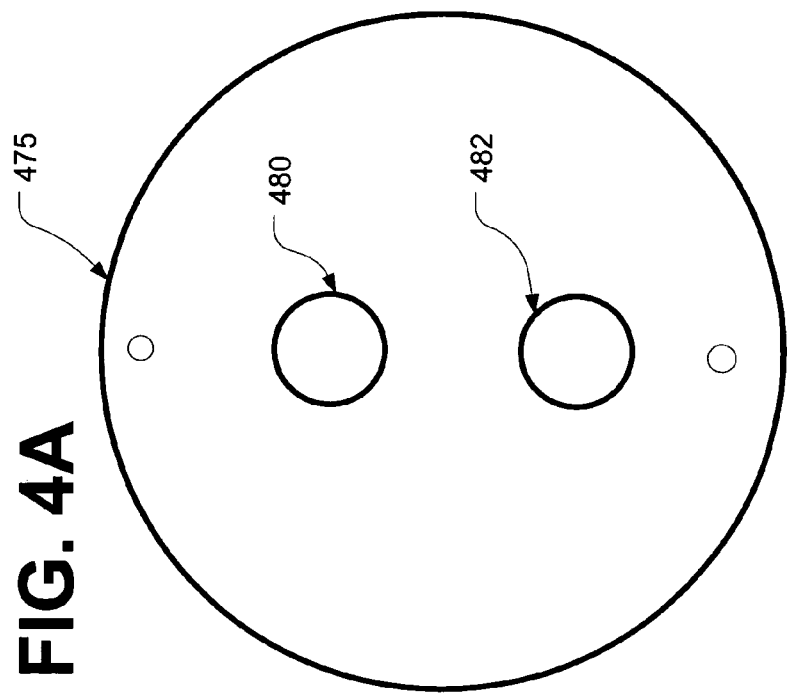
FIG. 4B
FIG. 4A

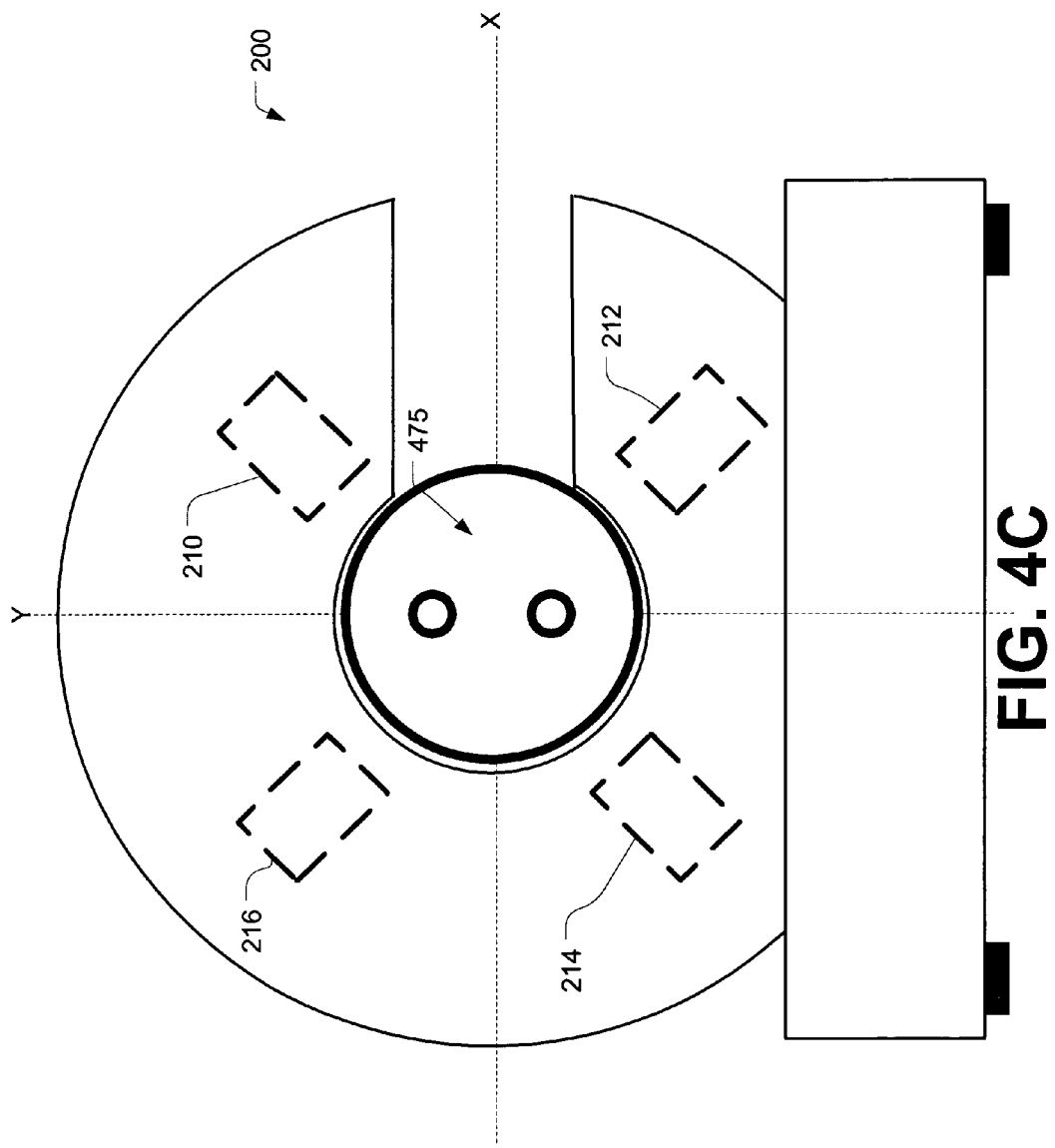

NON-CONTACT PROFILE MEASUREMENT SYSTEM

CLAIM OF PRIORITY

This application claims priority to co-pending U.S. provisional patent application entitled, "NON-CONTACT COMPUTER CONTROL MEASUREMENT OF A WORK PIECE," having Ser. No. 60/422,765, filed on Oct. 31, 2002, the disclosure of which is incorporated herein by reference, in it's entirety.

TECHNICAL FIELD

The present invention is generally related to measurement systems, and more particularly to a non-contact profile measurement system. The measurement system is suitable for use in, for example, continuous process manufacturing as well as other applications.

BACKGROUND OF THE INVENTION

In certain processes, such as manufacturing processes, it is necessary to evaluate work product in order to assure that it meets specifications or otherwise falls within predetermined criteria. For example, in extrusion processes, such as tire manufacturing, rubber material is extruded and linearly drawn into a predetermined shape for use in the tire. It is important that the shape or profile of this extruded material meet predetermined design specifications. Often this determination is made via comparing a profile representing product that meets specifications with the profile of a sample of product. Several methods of evaluating such product are known and include the use of optical comparators and/or offline inspection machines. Using these machines, a cross section of product is sampled and visually compared with a reference profile by an operator to determine/assess whether or not the sample falls within the specification profile. The accuracy and reliability of this method is highly contingent upon the operator. In short, it is only as good as the operator carrying out the visual comparison.

It is also common for personnel to utilize mechanical measurement tools, such as micrometers to physically measure a product sample to assess it's compliance with specifications. Again, the accuracy of this method is highly contingent upon the operator and consistent results can not be guaranteed.

With respect to work product that is nominally round in shape, devices known as shadow gauges, such as the LaserMike™ laser micrometer by Beta LaserMike, Inc., are often employed to check the diameter of work product. These devices do not however, allow for determining anything more than cross sectional dimensions in a predetermined reference plane. Further, as the work product may move within a given work zone, the dimension measured by the shadow gauge may not be the dimension of interest at a given time due to the movement of the work product.

In order to determine if the extruded product meets specification, it is common for production to be stopped at predetermined intervals to allow a sample of the extruded rubber product to be obtained for evaluation/comparison. This means production time is lost during the process of obtaining a sample. Further, since samples are taken typically at predetermined intervals, if product begins to fall out of specification between samples intervals, product output is lost before corrective action can be taken to bring the production back into spec. This results in lost time and wasted production.

In an effort to work around the short-comings of the known inspection/evaluation methods, off-line inspection systems have been adapted to on-line processes. There are known systems that utilize, for example, motorized positioning devices to transport one and/or position one or more measuring instruments within a predetermined region of interest. The region of interest will to typically be adjacent to or surrounding an area or path along which work product is passed during a manufacturing process. These systems do not, however, provide information about all points of interest at the same point in time. If the product moves during measurement, then the data does not accurately represent the product. Another drawback to this method is the initial cost and maintenance cost for such a motorized mechanism.

More recently, machine-vision approaches have been utilized to assess the shape and profile of in-process workproduct. "Smart camera" sensors from companies such as DVT, Inc. or Cognex, Inc. and structured light sources from companies such as Lasiris, Inc. can be combined to form a rudimentary measurement system. These systems suffer from inaccuracies due to non-linearity in the optics associated with the structured light sources and/or imperfections in the alignment of components that comprise the structured light source. Further, these systems do not provide the ability to inspect (evaluate) the entire profile of a work piece.

Other systems may have been introduced which incorporate an array of pre-calibrated contour sensors to allow for in-process inspection/evaluation of the complete shape and/or profile of a work piece during the manufacturing process. As each sensor in these systems must be registered (correlated) to a common coordinate space in order to allow collected data to be properly represented in relation to data collected by other sensors in the system and the work piece itself, efforts must be made to establish a correlation between the various coordinate spaces associated with each of the sensor devices and the work piece. The process for establishing a correlation between various the coordinate spaces associated with each sensor and a common coordinate space has been time consuming and cumbersome.

Further, these systems do not allow for the comparison of a work piece profile (as represented by captured profile data) with a predetermined reference profile, independent of the orientation of the work piece profile at the time of inspection/evaluation. These systems also present challenges in minimizing the areas of a work piece profile that are at least partially obscured from detection by one or more of the sensors.

Thus, a heretofore unaddressed need exists in the industry to address the aforementioned deficiencies and inadequacies.

SUMMARY OF THE INVENTION

The present invention provides a system and method for measuring features and dimensions related to the profile of a work piece. Briefly described, in architecture, the system can be implemented as follows. A sensor unit is provide that is configured to capture the profile of an object within a predetermined work zone and output data representative of said object. A control unit for receiving and processing data received from said sensor chassis is also provided.

In a further embodiment, a non-contact measurement system is provided that includes a sensor unit. The sensor unit is preferably configured to determine the diameter of a work piece The present invention can also be viewed as providing a method for evaluating a profile of a work piece. In this regard, the method can be broadly summarized by the following steps: correlating the coordinate space associated with two or more contour sensors with a common coordinate space; and generating profile data representing a profile of a predetermined work piece. In a further embodiment, a method of registering a sensor into a predetermined coordinate space is provided. The method includes the steps of receiving data representing the profile of a predetermined target; determining the X and Y coordinates and center point for the target; and determining translation parameters based upon the received data and the determined X and Y coordinates and the center point.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2A-FIG. 2D are block diagrams showing representations of an embodiment of sensor chassis 200.

FIG. 2E and FIG. 2F are block diagrams illustrating the orientation of the sensor chassis 200 with a work zone and a work piece.

FIG. 2I is a diagram illustrating a plot of points representing a captured profile within a coordinate space.

FIG. 2K is a diagram generally depicting a work piece within the un-calibrated pixel coordinate space of the sensor unit.

FIG. 3A is a block diagram showing a further representation of an embodiment of control unit 300.

FIG. 3B is a flowchart illustrating a method of measuring dimensions of a is profile.

FIG. 3I and FIG. 3J are block diagrams for explaining a method of determining degree of fit.

FIG. 3O is a block diagram illustrating an embodiment of control unit 300.

FIG. 4A and FIG. 4B are block diagrams illustrating an embodiment of a registration target 475.

FIG. 4C is a block diagram illustrating registration target 475 installed in sensor chassis 200 during a registration process.

DETAILED DESCRIPTION

The present invention is directed to a non-contact system and method for capturing data (profile data) representing a profile of a predetermined work piece. The system is configured to provide for in-process measurement/evaluation of the work piece. In operation, the system generates a digital representation of the dimensional attributes of the profile of a work piece as it is passed along a predetermined work path. The work path will preferably be routed so that the work piece passes within a predetermined detection range.

In a preferred embodiment, the system is configured to provide for display of a visual representation of a work piece for human evaluation. The displayed representation is based upon captured profile data. Further, in a preferred embodiment, the system is configured to provide for objective evaluation of a work piece based upon a displayed visual representation. The system may include tools for determining, for example, widths, thicknesses, radii and angles relevant to a work piece as shown in a displayed visual representation. These tools may be implemented in software. Further details and descriptions of the invention are set out below.

Figure 1A:
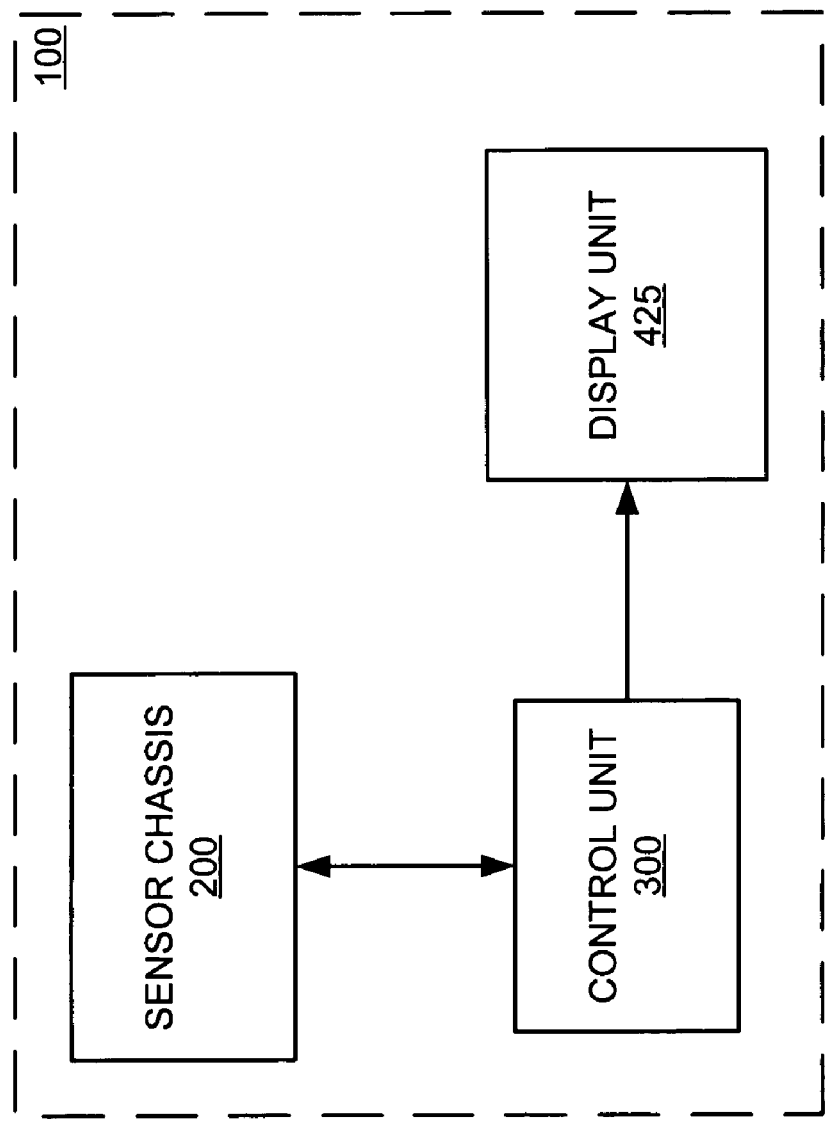
FIG. 1A and FIG. 1B are block diagrams illustrating a representation of an embodiment of measurement system 100.
Figure 1B:
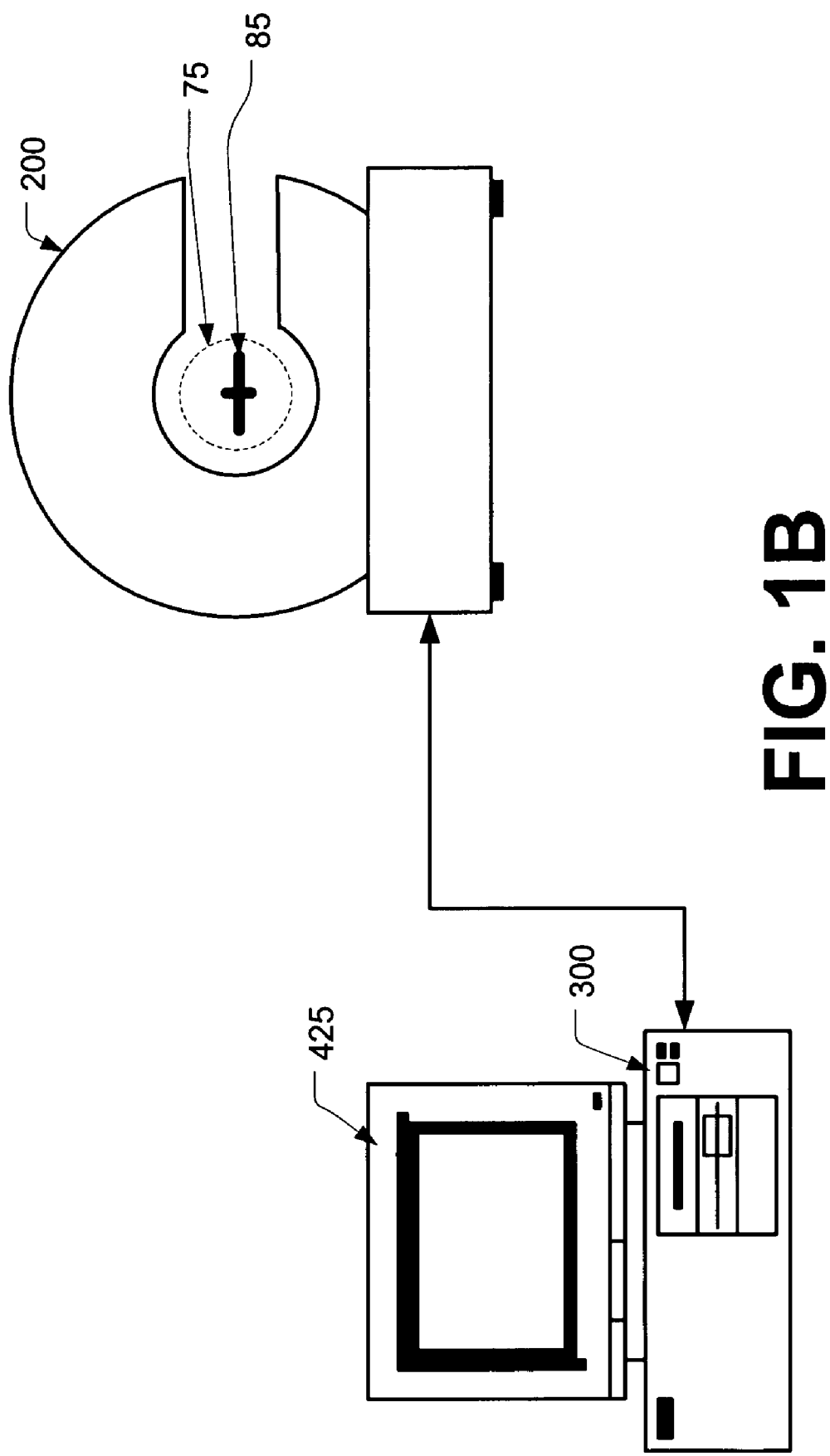

FIG. 1A and FIG. 1B are block diagrams illustrating a representation of an embodiment of a measurement system 100 according to the invention. A sensor holding chassis (sensor chassis) 200 is provided, along with a control unit 300 and a display 425. The sensor chassis 200 is configured to capture the profile to (profile capture) of a work piece 85 located within the work zone 75 by generating and outputting data representing at least a portion of the profile of a work piece 85 that is located within the work zone 75.

Figure 2B:
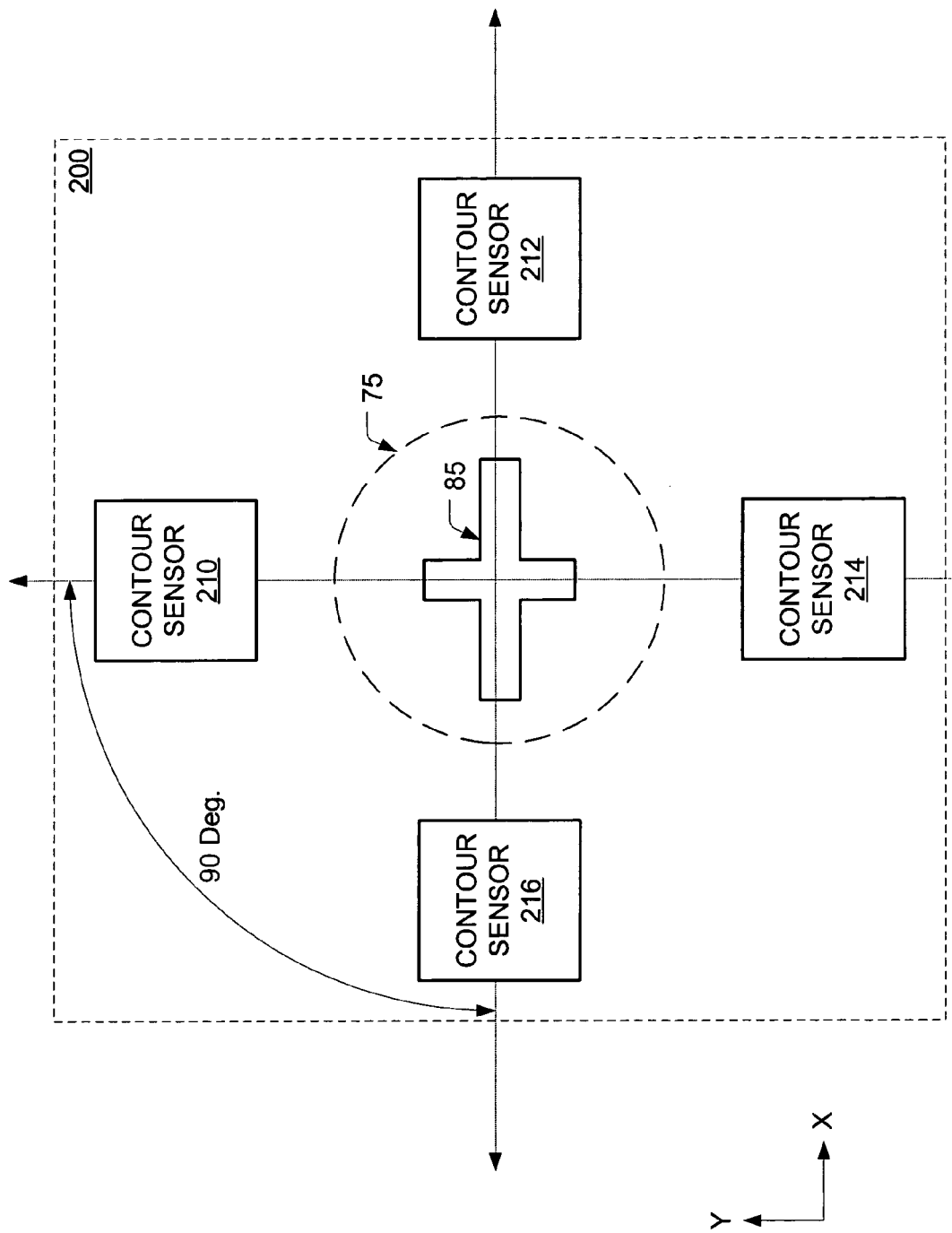

In a preferred embodiment, the sensor chassis 200 is configured to include one or more contour sensors (not shown), each for generating data representing an array of dimensional points representative of at least a portion of the profile of a work piece located within the work zone 75. The work zone 75 is a space in which a work piece 85 (FIG. 2A, FIG. 2B) may be placed or otherwise fed for evaluation.

The sensor chassis 200 is preferably interfaced with control unit 300 to exchange data and instructions. The sensor chassis 200 may be interfaced with control unit 300 either directly or via a network (not shown). In a preferred embodiment, the sensor chassis is configured to be compliant with the *Institute of Electrical and Electronic Engineers*, IEEE 1394 standard (also referred to as "firewire" or "i-link"). Display 425 is preferably included for displaying information in accordance with instructions received from the control unit 300.

Sensor Chassis

FIGS. 2A through 2D are block diagrams showing representations of an embodiment of sensor chassis 200. In these examples sensor chassis 200 is configured to include one or more contour sensors 210, 212, 214 and 216, respectively.

In a preferred embodiment, the contour sensors are optical devices each of which has a predetermined field of view (FOV). The FOV may also be referred to as the detection range of the sensor. An object within the FOV of the contour sensor will preferably be detectable by the contour sensor in that the contour sensor can receive light reflected from the object and generate an output in response thereto. The work zone 75 is preferably delineated so that a work piece 85 that is within the work zone 75 is within the FOV of one or more of the contour sensors 210, 212, 214 and 216. FIG. 2C shows the field of views F1, F2, F3, and F4 for each of the contour sensors 210, 212, 214 and 216, respectively. In this example, the FOV of each contour sensor covers a substantial portion of the work zone 75.

The sensor chassis 200 is preferably configured to position each of the contour sensors 210, 212, 214 and 216 in a predetermined alignment with work zone 75. They are also preferably positioned so a full 360° profile of a work piece 85 may be collectively captured by the contour sensors 210, 212, 214 and 216. In one embodiment, the contour sensors are radially aligned with the work zone 75. Further, they are preferably equally spaced about the circumference of the work zone 75 (i.e. at 90° intervals from each other). In a preferred embodiment, the sensor chassis is rotatable about the work zone 75. By rotating the sensor chassis the alignment of the contour sensors 210, 212, 214 and 216 in relation to the work zone 75 may be varied or adjusted as desired and insure that all details of the work piece profile can be captured by one or more of the contour sensors.

The sensor chassis may also be configured in size, shape or form that enable contour sensors to be positioned in desired location relative to areas/ports of the work product to be measured. A further alternate configuration includes a linear arrangement of contour sensors positioned above and below a wide and narrow work product.

Figure 2E:
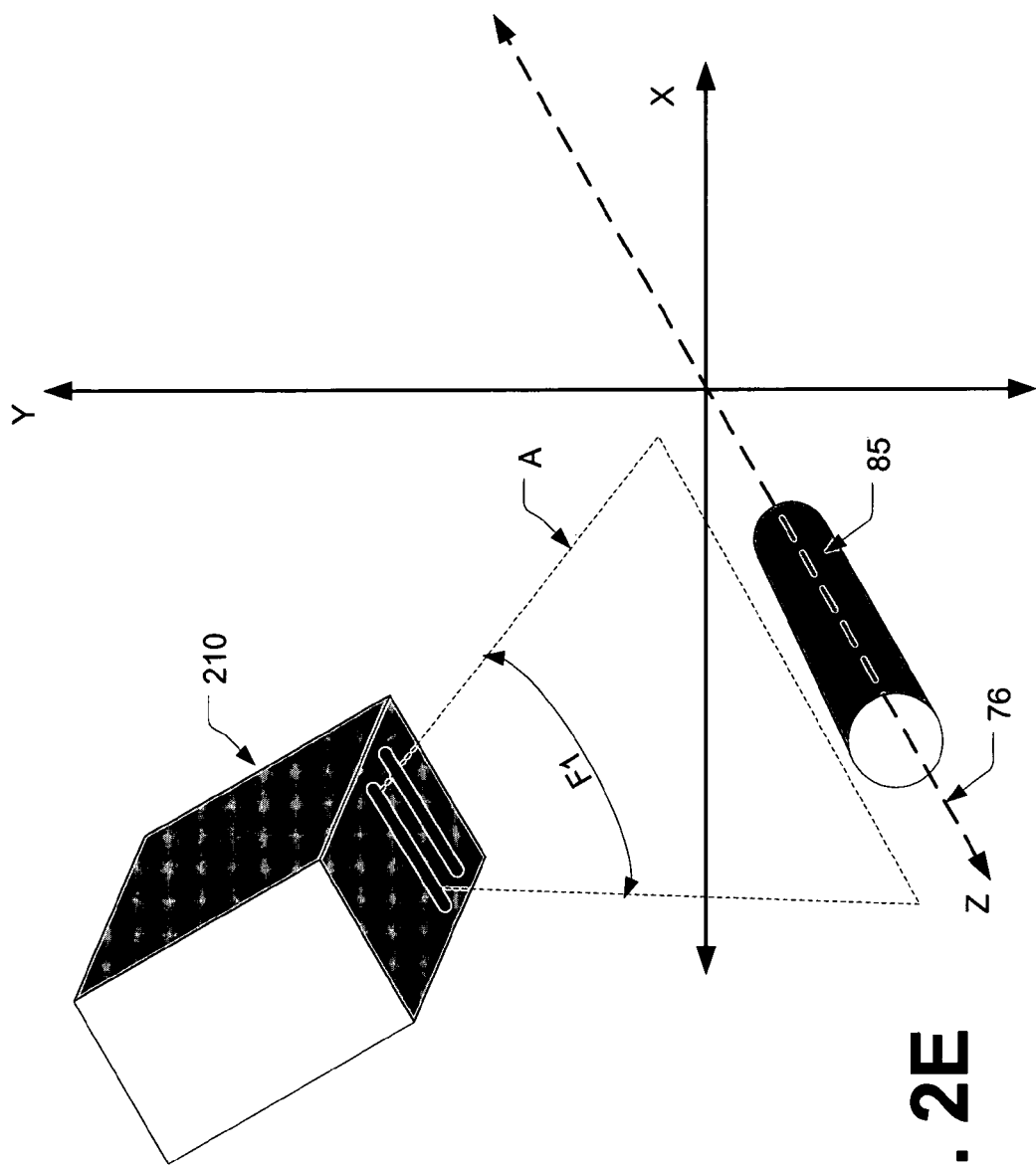

With reference to FIG. 2E and FIG. 2F the operation of sensor chassis 200 will be discussed. During operation, the sensor chassis 200 is placed along a work path 76 via which a work piece 85 travels during a particular production process. The sensor chassis 200 will be placed so that the work path 76 defines an axis Z along which the work zone 75 is defined. In these examples, the work piece 85 is cylindrical in shape and is fed through the work zone 75 along the work path 76. In this way, the profile of work piece 85 may be captured via the respective contour sensors 210, 212, 214 and 216 of sensor chassis 200.

Figure 2H:
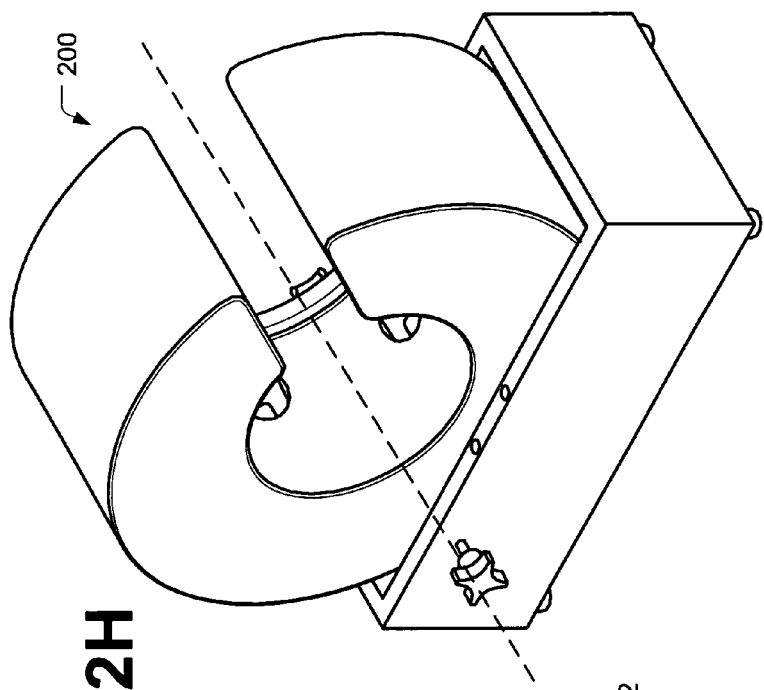
FIG. 2H is a block diagram showing a representation of diction unit 240.
Figure 2G:
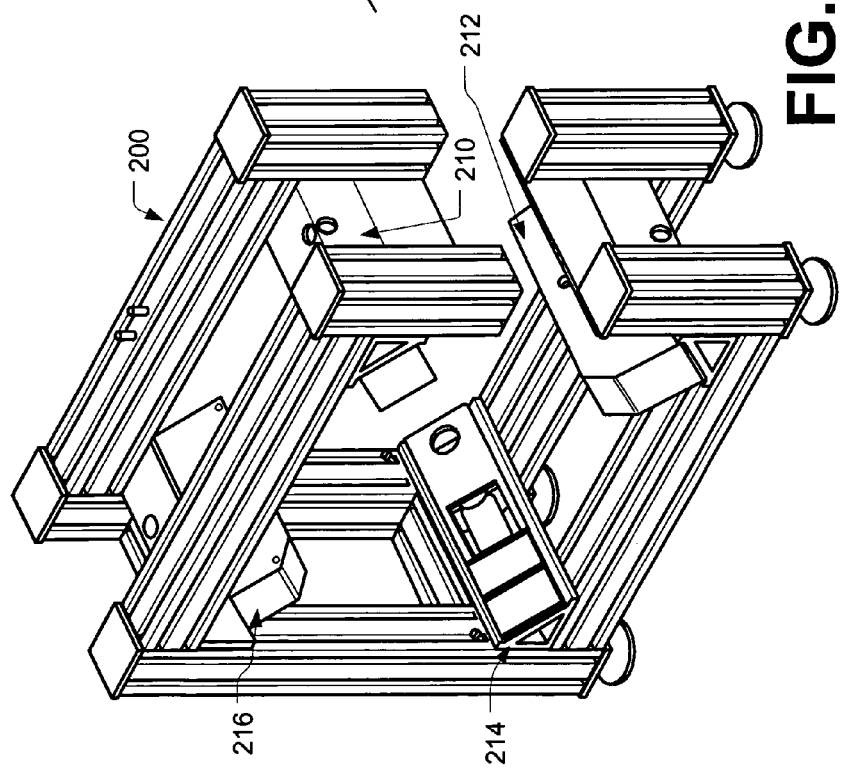
FIG. 2G is a block diagram showing a further representation of an embodiment of a contour sensor 210.
Figure 2J:
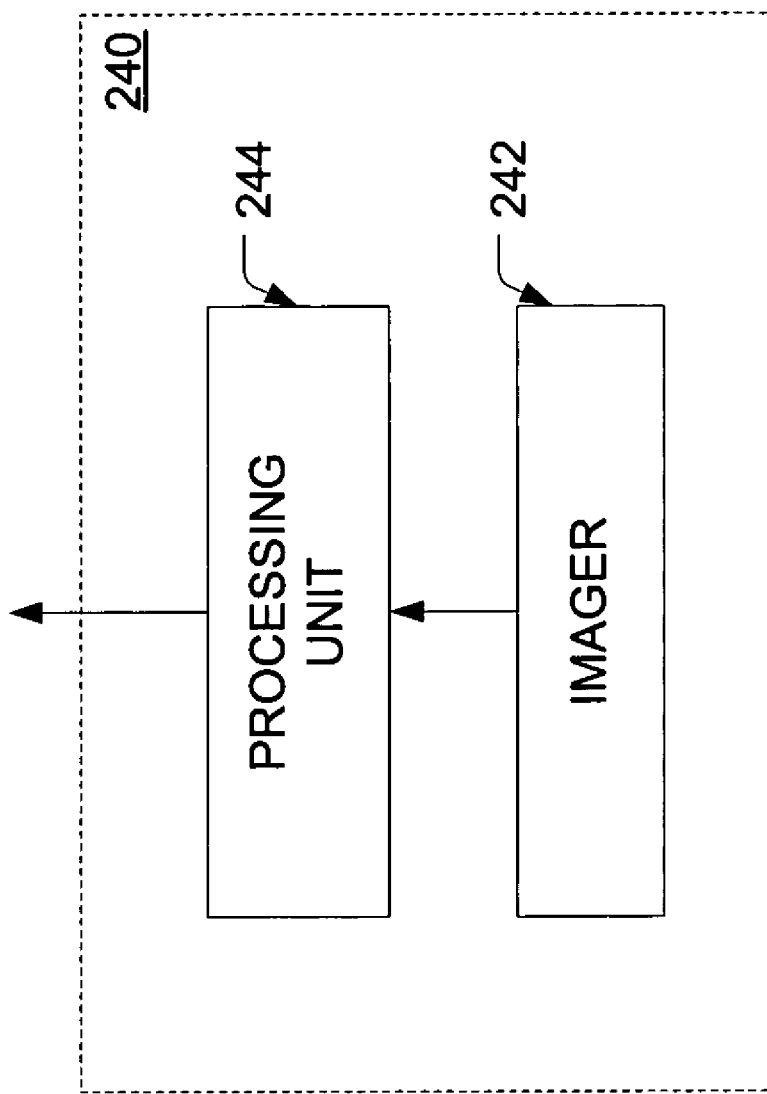
FIG. 2J is a block diagram generally depicting details of contour sensor unit 240.

FIG. 2G and FIG. 2H are diagrams showing representations of further embodiments of sensor chassis 200. FIG. 2G shows a sensor chassis 200 that is configured in a generally square shape with contour sensor 210, 212, 214 and 216 supported in position thereon. FIG. 2F shows a perspective view of the sensor chassis embodiment previously shown and discussed with respect to FIGS. 2A and 2D.

FIG. 2I is a block diagram showing a representation of an embodiment of a contour sensor 210. It will be recognized that each of the contour sensors 210, 212, 214 and 216 are preferably the same in configuration, thus a discussion of contour sensor 210 is equally applicable to contour sensors 212, 214 and 216. It can be seen that contour sensor 210 includes an illumination unit 230 and a detector unit 240. The illumination unit 230 is configured to generate and output a beam or sheet of light "A". The illumination unit 230 is preferably positioned so that the output beam of light A will be directed into the work zone 75. Where a work piece 85 is present within the work zone 75, at least a portion of the beam of light A will be reflected from the work piece 85. The detector unit 240 is positioned so as to be aligned to receive at least a portion of the beam of light A that is reflected from the work piece 85.

The illumination unit 230 may be, for example, a laser or white light source. It may be, for example, a structured light source configured to output a "sheet of light". In a preferred embodiment illumination unit 230 is a laser line generator such as the Lasiris™ SNF Series Structured Light Projector. Detector unit 240 may be configured to include an imager, for example, a charge coupled device (CCD) imager such as the Sony ICX204AL series CCD detector. Alternatively, the detector may be configured to include a complementary metal oxide semiconductor (CMOS) imager such as the FillFactory IBIS4 series CMOS detector. In a preferred embodiment, the detector unit 240 is a CCD imager comprising an array of 1024 pixels by 768 pixels. The detector unit 240 may also be configured to include optics for focusing light onto an imager, such as CCD imager or CMOS imager.

There are various types of known contour sensors in existence. They include those sensors known as "structured light triangulation" types, such as the M2D sensor family manufactured by MEL; "flying spot triangulation" types, such as the LMI/Selcom SPS2301 sensor and "flying spot time of flight", such as the SICK LMS 200 Laser Measurement System. Structured light triangulation sensors have previously been described in "*Sheet-of-light Range Imaging*", Mattias Johannesson, *Linkoping Studies in Science and Technology. Dissertations No.* 399 *SIMD Architectures for Range and Radar Imaging, Linkoping* 1995. Further, the contour sensors may be configured as ultrasonic sensors responsive to ultrasonic radiation, Stereo Imaging sensors, Scanning Moire Interferometry™, etc. The contour sensors 210, 212, 214 and 216 may be implemented as any one of the several known contour sensor types.

Each of the contour sensors is uniquely aligned with the workspace 75. When a work piece 75 is in the work zone 85, it will preferably be within the FOV of one or more of the contour sensors 210-216. As each contour sensor emits it's respective light beam, it strikes the work piece 75 and is reflected, at least in part, back to the detector unit 240 of the contour sensor. In response, the to detector unit will generate an output signal S representative of the sensor coordinates describing the profile of the work piece 75 within the sensor coordinate plane. This output signal S is then output to the control unit 300. Each contour sensor is preferably attached to the sensor chassis 200 via an interface (not shown) that allows the contour sensor to be aligned so that the light beam emitted by the contour sensor corresponds to a predetermined plane. In a preferred embodiment, each of the contour sensors 210, 212, 214 and 216 are aligned so that the light beams emitted by each contour sensor is substantially aligned along a common plane (plane of inspection). In one embodiment, the interface is configured as a three-point interface (not shown).

In order to minimize interference caused by a sensor unit responding to the light output by an adjacent sensor unit, the respective illumination units of each sensor unit may be configured to output light having different wavelengths. Similarly, the detector units of each sensor unit may be configured to be responsive only to the wavelength of light emitted by the corresponding illumination unit thereof. In one embodiment, sensor unit 210 and 214 are configured to emit and respond to light having a first wavelength (for example, 635 nm), while sensor units 212 and 216 are configured to emit and respond to light having a second wavelength (for example 690 nm). Additionally, optical filters may be placed within the optical path of each sensor unit to allow light of only a predetermined wavelength to pass through to the sensor unit.

FIG. 2I is diagram illustrating a further embodiment of detection unit 240. The detection unit 240 may be configured to include an imager 242 for receiving light and generating a signal in response to the received light, and a conversion unit 244 for converting the signal generated by the imager into a predetermined data format. In one embodiment of the contour sensor 210, the detection unit 240 is implemented as, for example, a CCD line imager having an imager array of 1024 columns of 768 pixels. Depending on the position at which the target is located and the angle at which reflected light is received by the CCD imager, certain pixels within one or more of the 1024 columns will respond by generating an output voltage. As the beam of light received from the illuminator unit will be very narrow, only a small number of pixels within each column will be excited. The output of all 1024 columns will collectively represent at least a portion of the work piece from which light is reflected and received by the CCD imager.

FIG. 2K is a diagram illustrating an image of a work piece 75 in the un-calibrated pixel coordinate space of the sensor unit. In this example, a profile of the work piece 85 is represented by a series of points running from 0 to 1024 in the X direction and from 0 to 281 in the Y direction. Each of the points is described by a corresponding X and Y coordinate value. In a preferred embodiment, the Y axis value is calculated by determining the centroid of the image of the structured light source. The purpose of the centroid calculation is to yield resolution beyond that offered by each pixel boundary (sub-pixel resolution). Further, the uncorrected data, may be corrected in both the X and Y dimensions before being output from the contour sensor to eliminate inaccuracies due to the triangulation principle itself, imaging optics, the optics producing the structured light, and/or imperfections in the relative alignments between all these elements.

A preferred method of correction may be carried out by use of a look up table (LUT). In this method a look-up table is created during a predetermined calibration procedure. The LUT defines an association between a set of known displacements (in world units, such as microns) with a set of pixel centroid values. Each of these data pairs can be considered a "look-up node". For each measured Y value in pixels, the nearest bounding look-up nodes above and below the measured value are determined. The corrected measurement value may then be calculated to be the same proportion between the world-unit look-up values as the proportion between the pixel unit look-up values.

The X axis value for each data pair may then be corrected in a similar manner to the vertical (Y axis) correction, where two known horizontal references that are contained in a look-up table are utilized to interpolate the horizontal (X axis) pixel value into a horizontal real-world value.

The sensor imager is refreshed at a predetermined cycle or specific instance. An (X,Y) pixel data pair is determined for each of the 1024 columns in the imager for each cycle or instance. This (X,Y) pixel data is preferably converted into (X,Y) world units by the contour sensor processing unit 244, and then output to the control unit 300. It should be noted that the contour sensor processing unit 244 is not required to be physically inside the contour sensor 240. The functions thereof may be performed by any processing resource so assigned, such as a personal computer. The functions of processing unit 244 may also be alternatively carried out by controller 300.

In a further embodiment, the sensor unit 210 is configured to measure the diameter and/or the center point of a work piece 85 that is at least nominally round in shape. In this embodiment, the sensor unit 210 receives light reflected from a work piece 85. In turn, the detection unit 240 outputs data representing points along the profile of the work piece. The profile data is fed to processing unit 244. The processing unit 244 receives the profile data and determines a diameter of the work piece 75 based upon the received profile. In a preferred embodiment, the diameter and/or the center point of a work piece is calculated by the conversion unit based upon a non linear regression fitting of data to a circle of either known or unknown diameter. These methods are known to those persons skilled in the art.

Control Unit

FIG. 3A further illustrates a representative embodiment of control unit 300 (FIG. 1A). The control unit 300 is preferably configured to include a visualization module 362, a measurement module 364, a correlation module 366, registration module 368 and template matching module 370.

Visualization Module

The visualization module 362 is configured to display text or graphical information for viewing on an associated display device 425. The measurement module 362 is configured to carry out predetermined calculations and/or measurements with respect to a predetermined work piece. Such calculations and measurements may include, but not be limited to, determining lengths or distances between two points, determining the angle between two lines, determining the radii and center point for an arc that is identified to be of interest. Further, the measurement module may be configured to determine the degree of fit between the detected profile and a known "reference" profile.

Measurement Module

With reference to the flowchart of FIG. 3B a process of measuring parameters of a captured profile will be described. Methods are described for determining Lengths and Widths, Angles, Circles and Arcs, and Degree of Fit Measurement Module—Lengths and Widths Data describing a control point (CP) is received (380). Additional data describing a $2^{nd}$ control point is received (382). The distance between these two control points is then determined based upon known characteristics of the coordinate space in which the control points exist (384). In one embodiment, data describing control points (CP) is generated in response to user inputted constraints.

Selection of control points may be carried out, for example, via using a pointing device, such as an associated mouse 325 (FIG. 3O) to identify/select relevant control points in the window view 427 shown on display 425. The selected control points are denoted herein via graphical pointers.

Figure 3C:
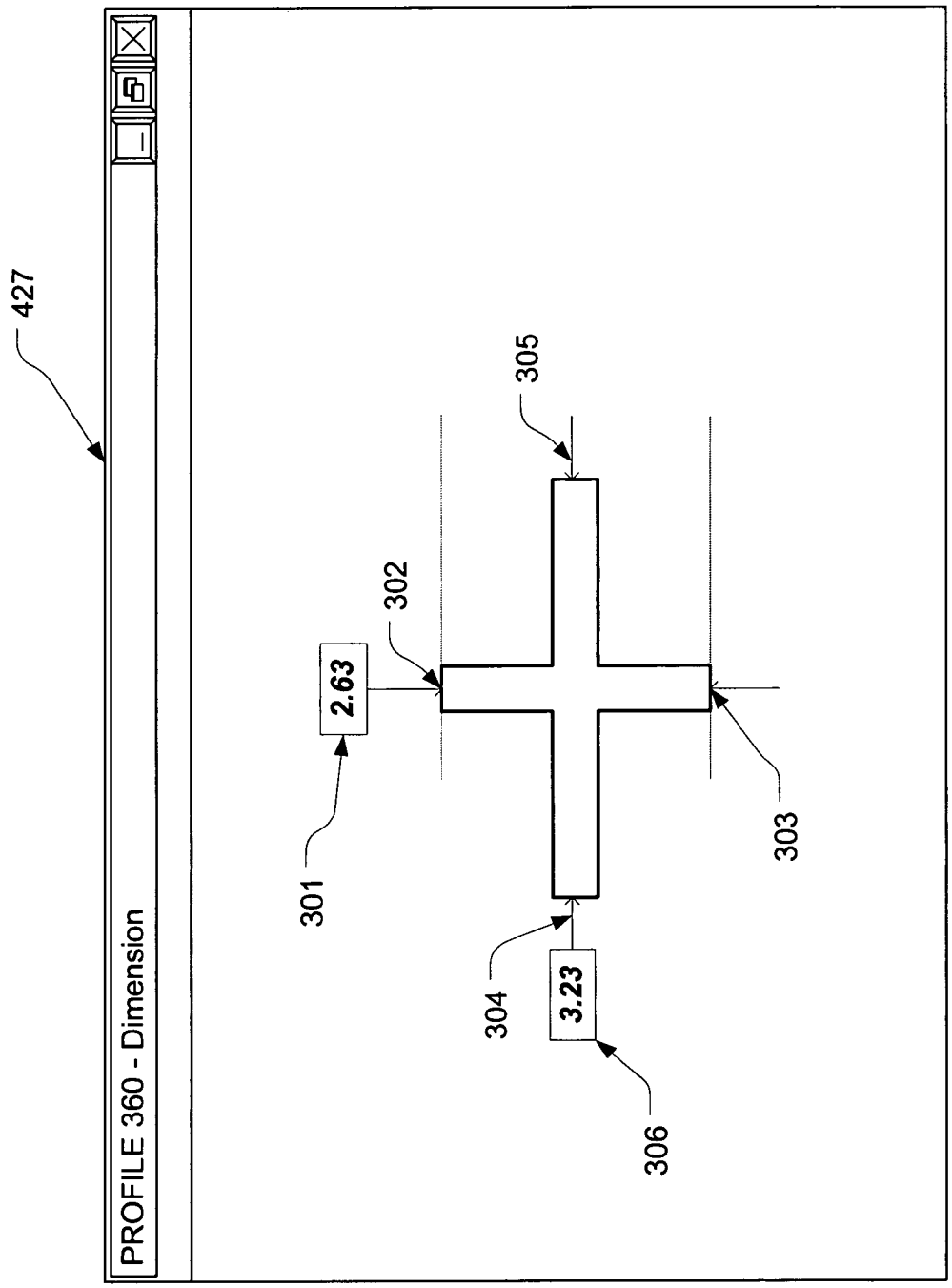
FIG. 3C is a block diagram providing a further illustration for explaining the method of FIG. 3B.

In FIG. 3C, the display window 427 shows a screen view depicting the profile of a work piece 75. The profile of the work piece 75 is in the general shape of a cross. Display 425 displays a screen view that is representative of the work piece profile within the chassis coordinate system. Here a display window 427 is displayed on display device 425. The 2 dimensional window is referred to as the "window coordinate space". This window coordinate space directly corresponds to the chassis coordinate system. The view displayed on display 425 will preferably be a directly scaled representation of the chassis coordinate system. Thus, dimensions shown in the displayed screen view can be used to determine the actual dimensions of a work piece 75. Selection of control points may be carried out algorithmically, for example, by using a pointing device, such as an associated mouse 325 (FIG. 3O) to identify/select relevant control point constraints in the screen view shown on display window 427.

In this example, control points 302 and 303 have been selected by a user, preferably via clicking on the desired point with a pointing device 325 (FIG. 3O). The distance 301 between the two control points 302 and 303 is shown to be 2.63. Similarly, control points 304 and 305 are selected and the distance 306 between them is shown to be 3.23.

Measurement Module—Angles

Figure 3D:
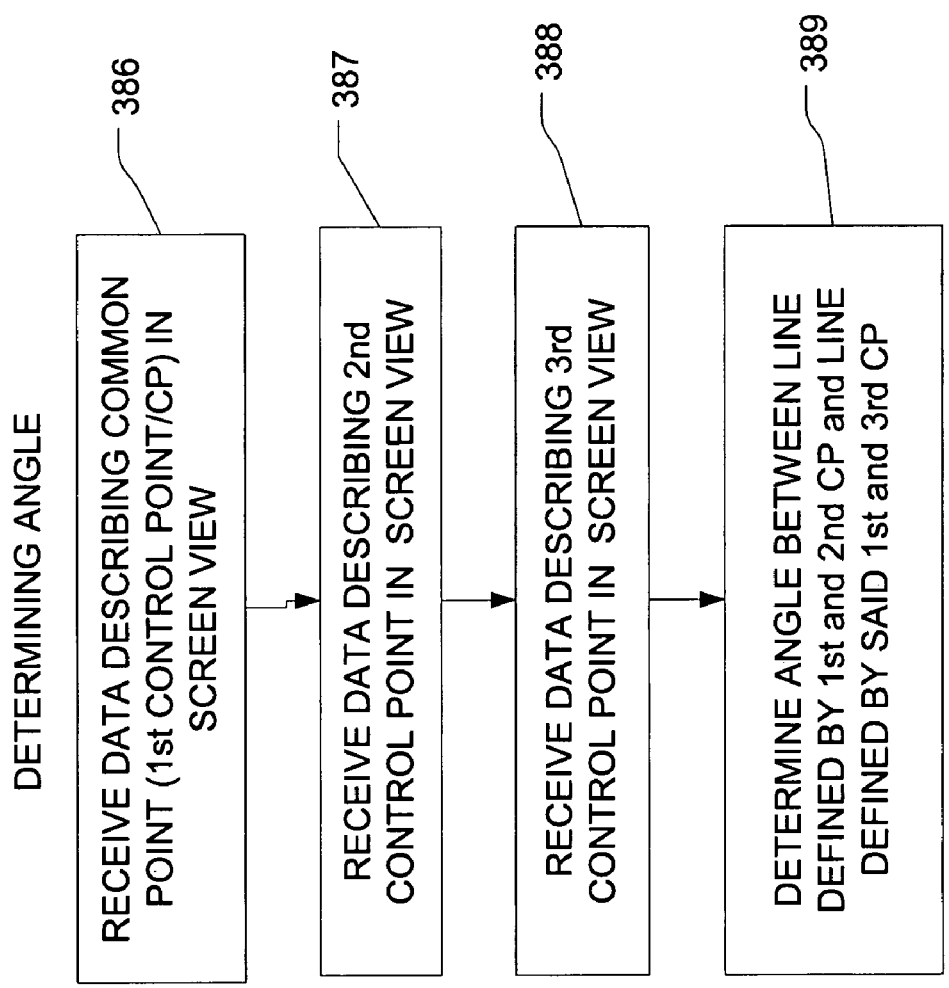
FIG. 3D is a flowchart illustrating a method of determining an angle of interest of on a profile.
Figure 3E:
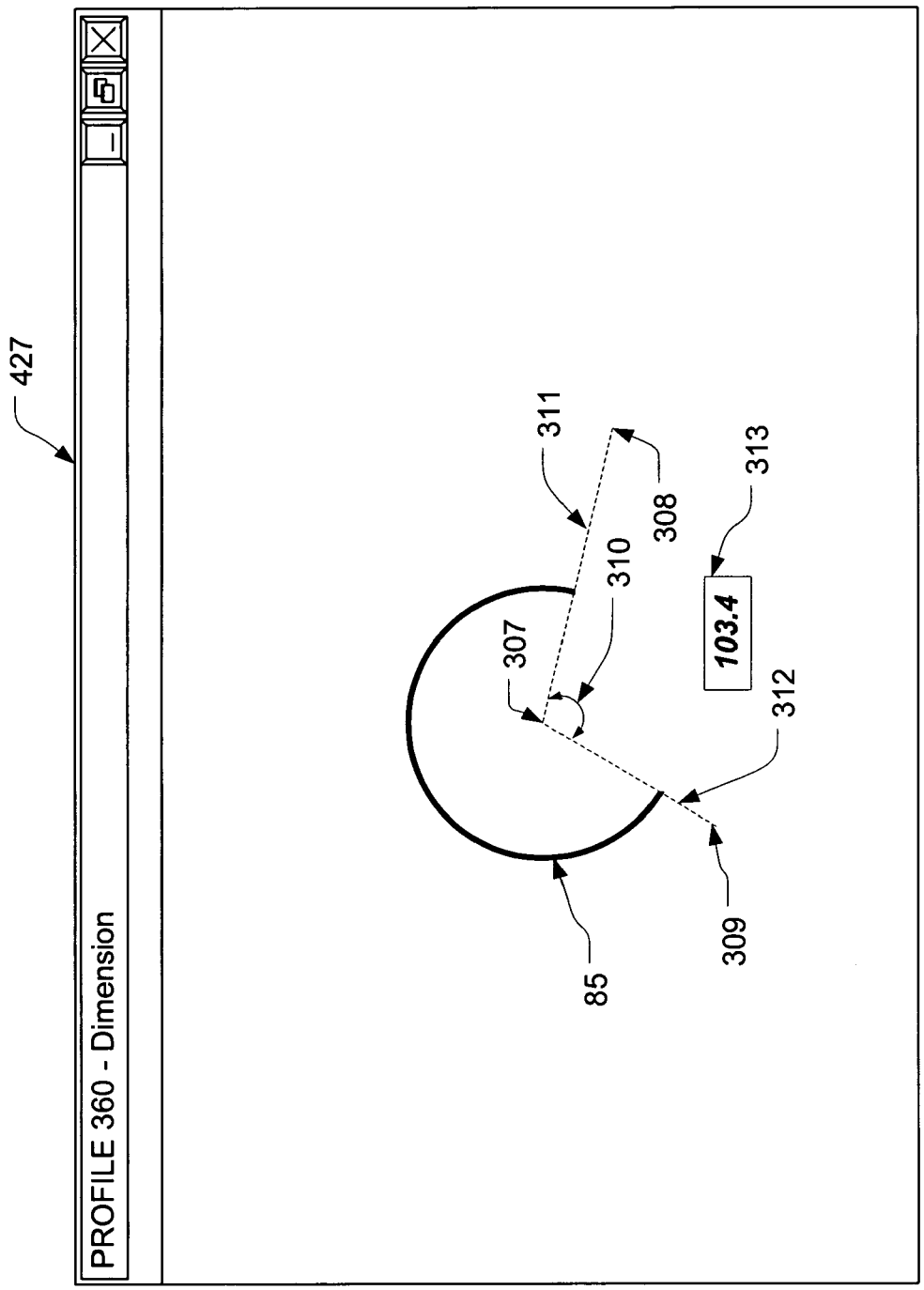
FIG. 3E is a block diagram providing a further illustration for explaining the method of FIG. 3D.

The flowchart of FIG. 3D illustrates a method of determining the angle of a given feature of a captured profile. FIG. 3E is a block diagram representing an to embodiment of the invention in which angle measurements can be made based on a displayed profile. In this method, data describing a first control point is received (386). The first control point will preferably be the vertices of two lines, the angle between which is of interest. The control point may be selected/identified by a user via, for example, a pointing device 325, as described and discussed above with respect to the method illustrated in FIG. 3B. Data describing a second control point is received (387). This second control point will represent an end point of one of the two lines, the angle between which is of interest. Data describing a $3^{rd}$ control point is received (388). This third control point will be the end point of the second line. The three control points have now defined two lines. The angle between these two lines is determined (389).

FIG. 3E shows a display window 427 that depicts a profile of a work piece 85. A first control point 307 is denoted, as is a second control point 308 and a third control point 309. The angle 310 between the line 311 (defined by control points 307 and 308) and the line 312 (defined by the control points 307 and 309) is shown to be 103.3 by an indicia 313.

Measurement Module—Circles and Arcs

Figure 3F:
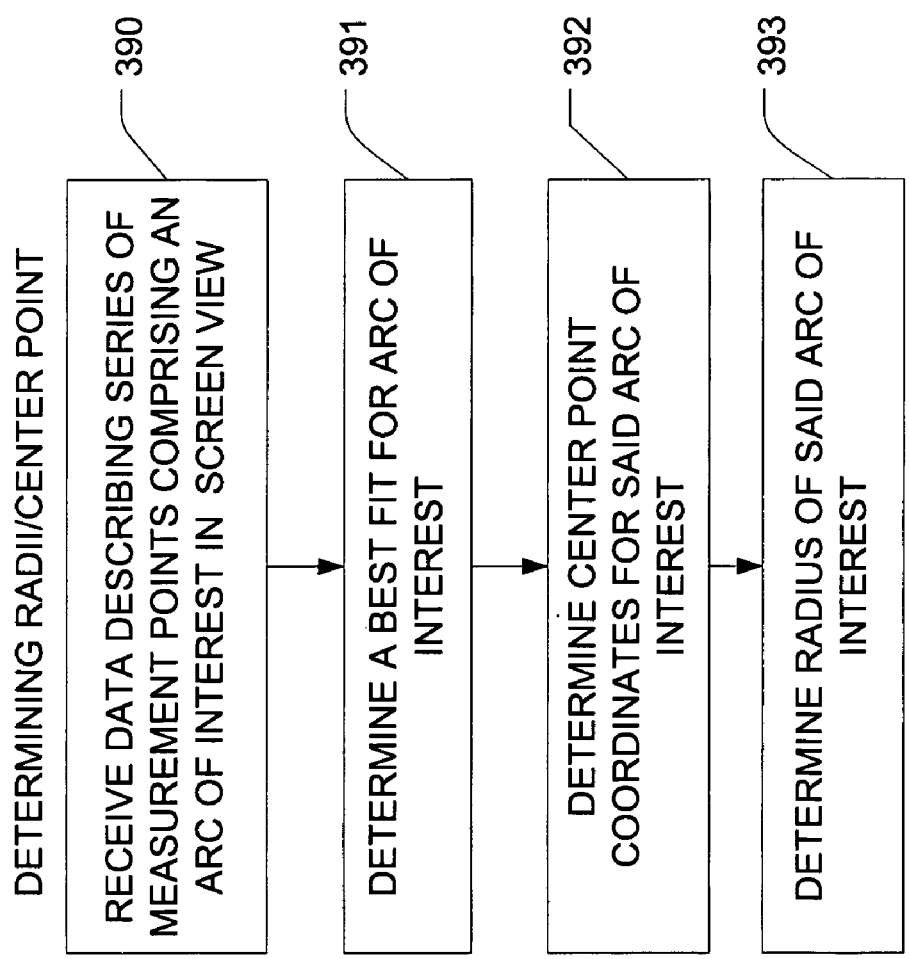
FIG. 3F is a flowchart illustrating a method of determining a radius and/or curve of a feature in a profile.

FIG. 3F is a flowchart illustrating a method of determining the radius and/or center point of a curve or arc that is identified to be of interest. Data is received that describes a series of digitized (X,Y) data points (390). These digitized points will generally define an arc. A best fit will be determined for the arc defined by the selected digitized points (391). In one embodiment, the best fit to curve may be carried out using known principals of regression. Once a circle has been determined that best fits the arc defined by the selected control points, the center point of the arc is determined (392). Further, the radius of arc is determined (393).

Figure 3G:
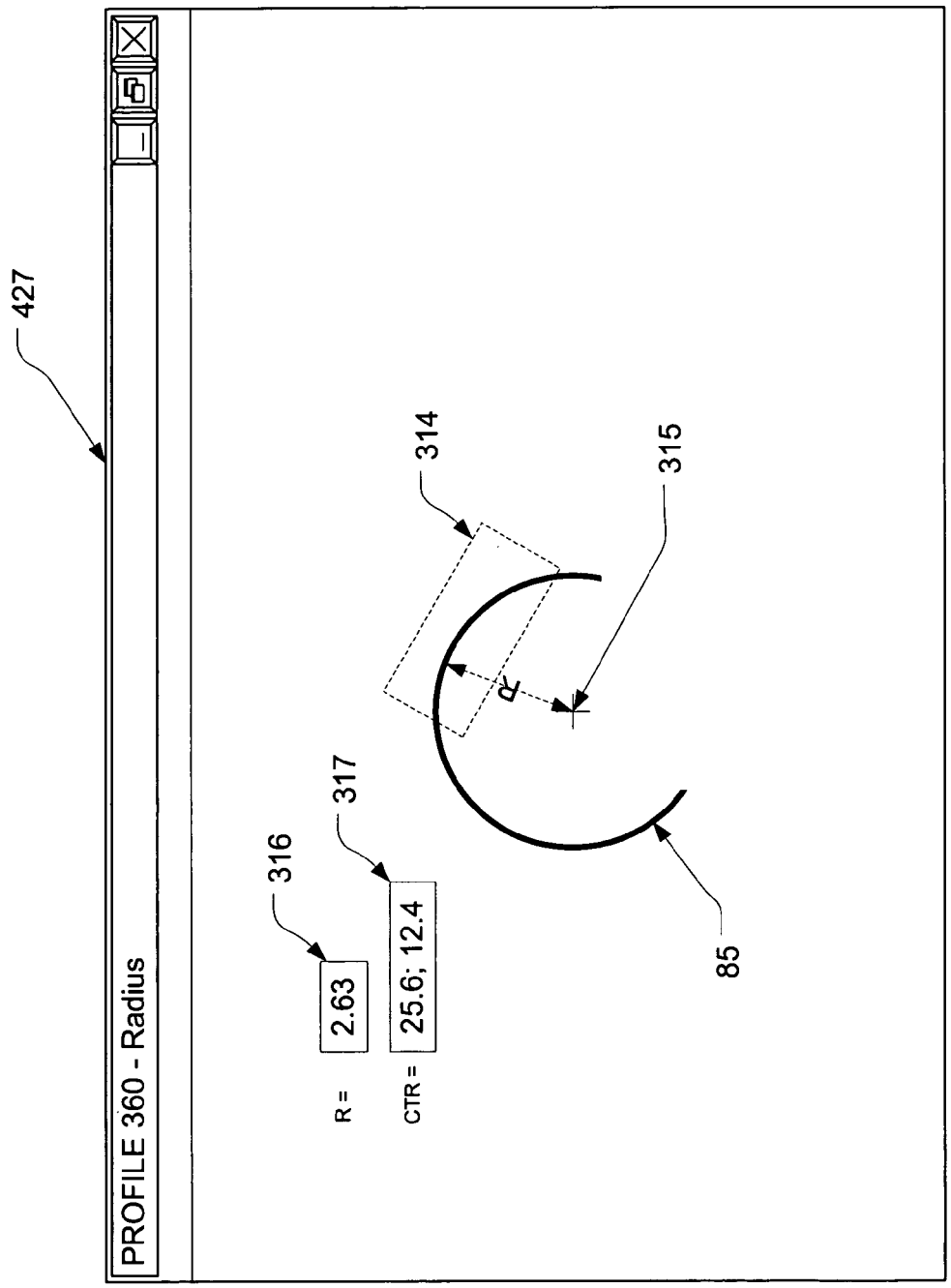
FIG. 3G is a block diagram providing a further illustration for explaining the method of FIG. 3F.

FIG. 3G is a block diagram showing a display window 427 depicting the profile of a work piece 85. In this diagram the work piece is semi-circular in shape. An arc of interest has been identified by selection box 314. The selection box 314 may be generated/drawn via a pointing device using known techniques of clicking and dragging to produce a box of appropriate proportions. The radius R is determined and displayed and denoted as 2.63 by indicia 316. Similarly the coordinates for the center point 315 are identified as 25.6; 12.4 by indicia 317.

Measurement Module—Degree of Fit

Figure 3H:
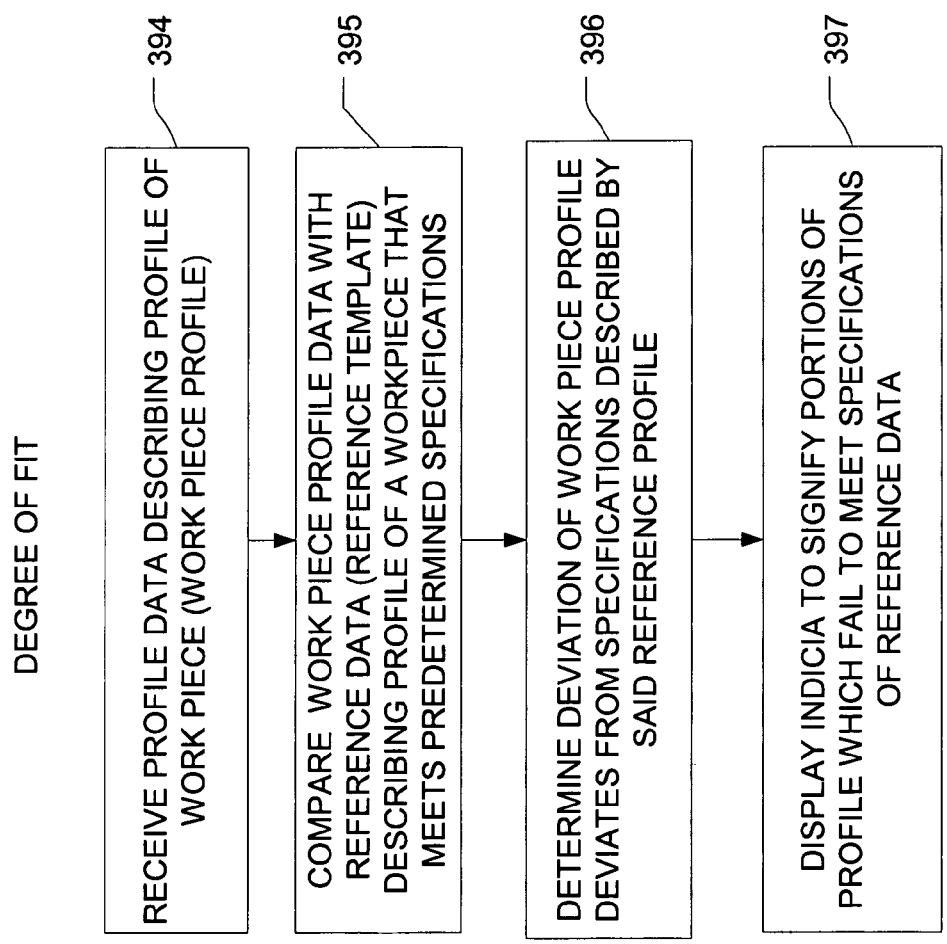
FIG. 3H is a flowchart illustrating a method of identifying errors in a profile.
Figure 31:
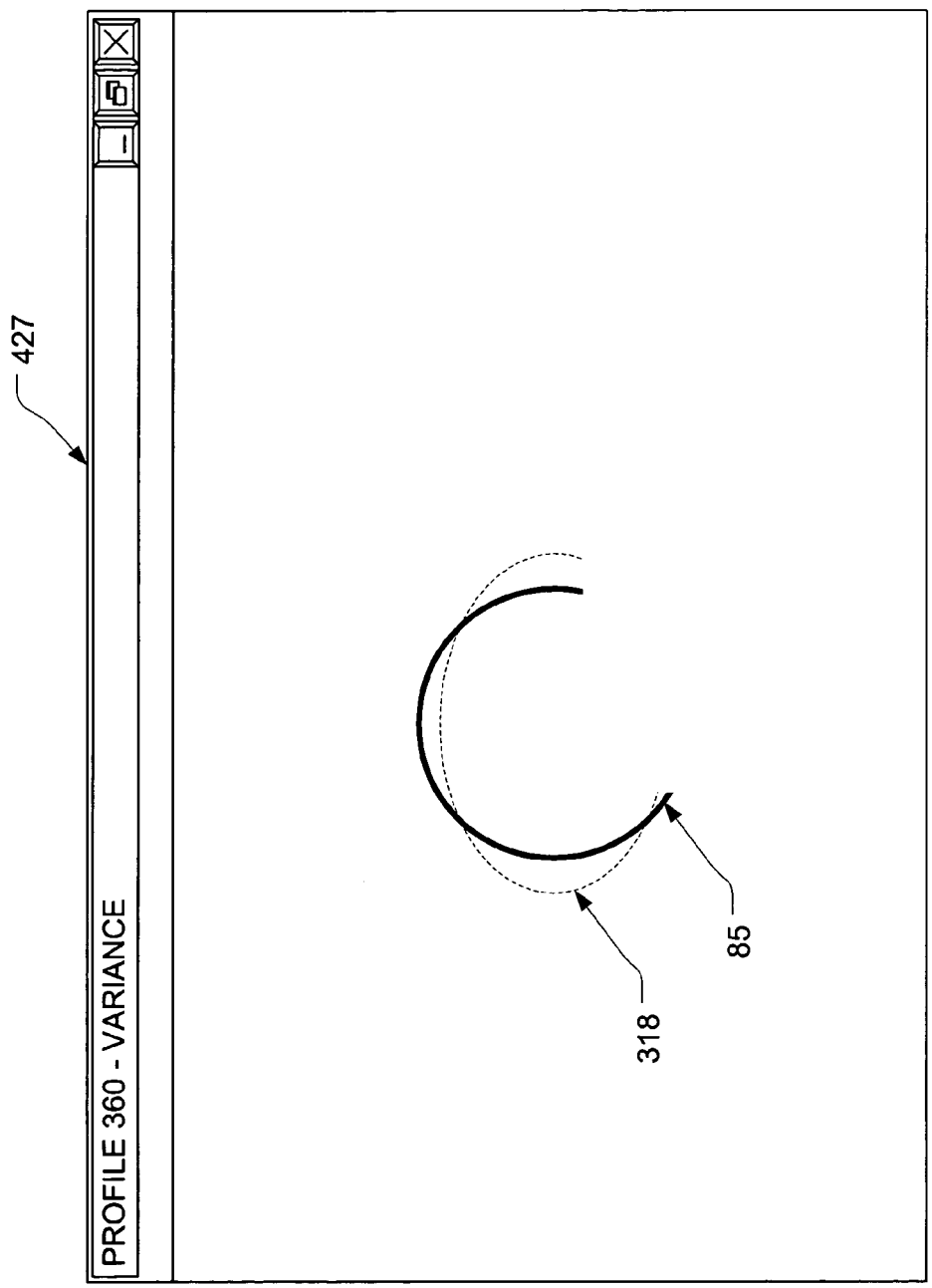

FIG. 3H is a flowchart illustrating a method of identifying portions of a work piece that do not meet a predetermined specification via matching a captured profile with a reference template. In this method, data describing a profile of a work piece of interest is received (394). This profile data is then compared with reference data (reference template) that describes predetermined specifications (395). In a preferred embodiment, the reference template may be stored into memory associated with the control unit 300. A determination is made as to whether or not the captured profile data varies from the specifications setout by the reference template (396). An output is then generated to cause indica signifying portions of the work piece represented by the captured profile data, that fail to meet the specifications of the reference template to be displayed on an associated display device 425 (397).

Figure 3J:
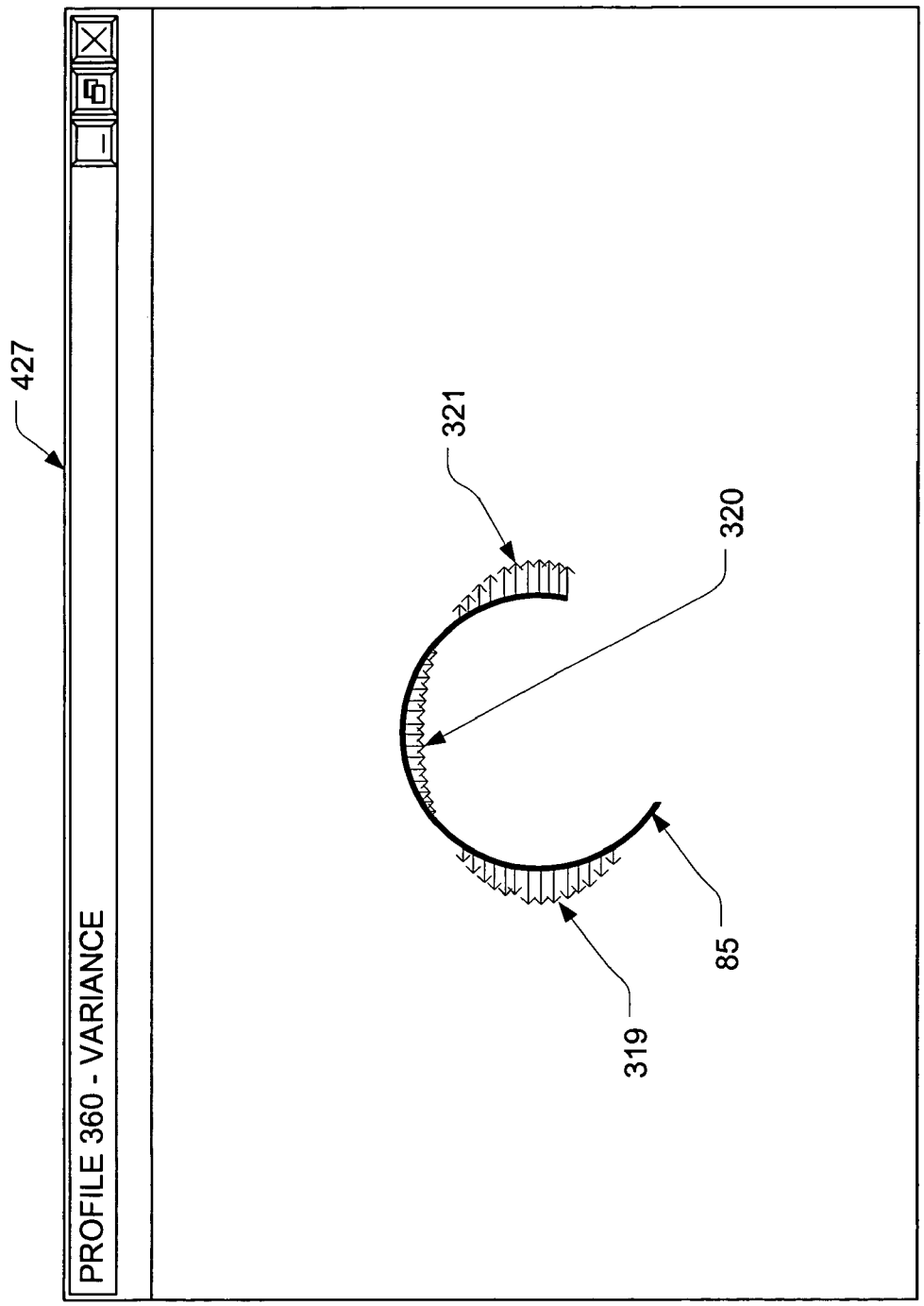

FIG. 3I is a block diagram showing a window display 427 in which a graphic representation of a profile of a work piece 85 is displayed along with a graphic representation of the profile of a reference template 319 (reference profile). In this example, the work piece profile does not match the reference template 318 (i.e. the profile of the work piece 85 does not meet the specifications described by the reference template 318). With reference to FIG. 3J, indicia 319, 320 and 321 are displayed to indicate the areas in which the work piece profile fail to conform to the reference profile 319. These indicia may be, for example, denoted as vectors which vary in length in order to indicate the relative magnitude of the variance/error between the captured profile of the work piece and the reference profile 319. Alternatively, the indicia may be denoted so as to indicate the existence of variance/error, without any magnitude being presented.

Template Matching Module

Template matching module 370 (FIG. 3A) is configured to transform the co-ordinate space of the sensor chassis 200 and a reference template into a like co-ordinate system. This allows stored instructions for the control point determinations to be properly applied. It also allows for degree of fit analysis to be performed. The reference template may be stored as data onto memory associated with the control unit 300. In one embodiment, the reference template will describe the desired profile and one or more tools for evaluating the captured work piece profile. For example, where the width of a portion of the work piece profile is to be measured, the reference template may include data indicating what measurements of the captured work profile are desired. Further, the reference template may include data to identify control points along the captured work piece profile that should be used in carrying out the specified measurement(s).

In order to make the comparison of captured profile data with a reference template, it is necessary to correlate the captured reference profile with the reference template or vice versa. More particularly, in order to evaluate the captured profile data in view of the reference template, it is necessary that the coordinate space in which the captured profile data is described be correlated to the coordinate space in which the reference template is described. This to correlation may be established in several ways. In one method a translation of the captured profile data is carried out to bring the data points represented by the captured profile data into a space common with the data points represented by the reference template. Once the translation has been made, the captured profile data is rotated about a predetermined center point to find the angle that provides the best direct correlation between the captured profile data and the reference template. The best correlation between captured profile data and the reference template may be referred to as the best match quality. This method is further described by the flowchart shown in FIG. 3H.

Figure 3K:
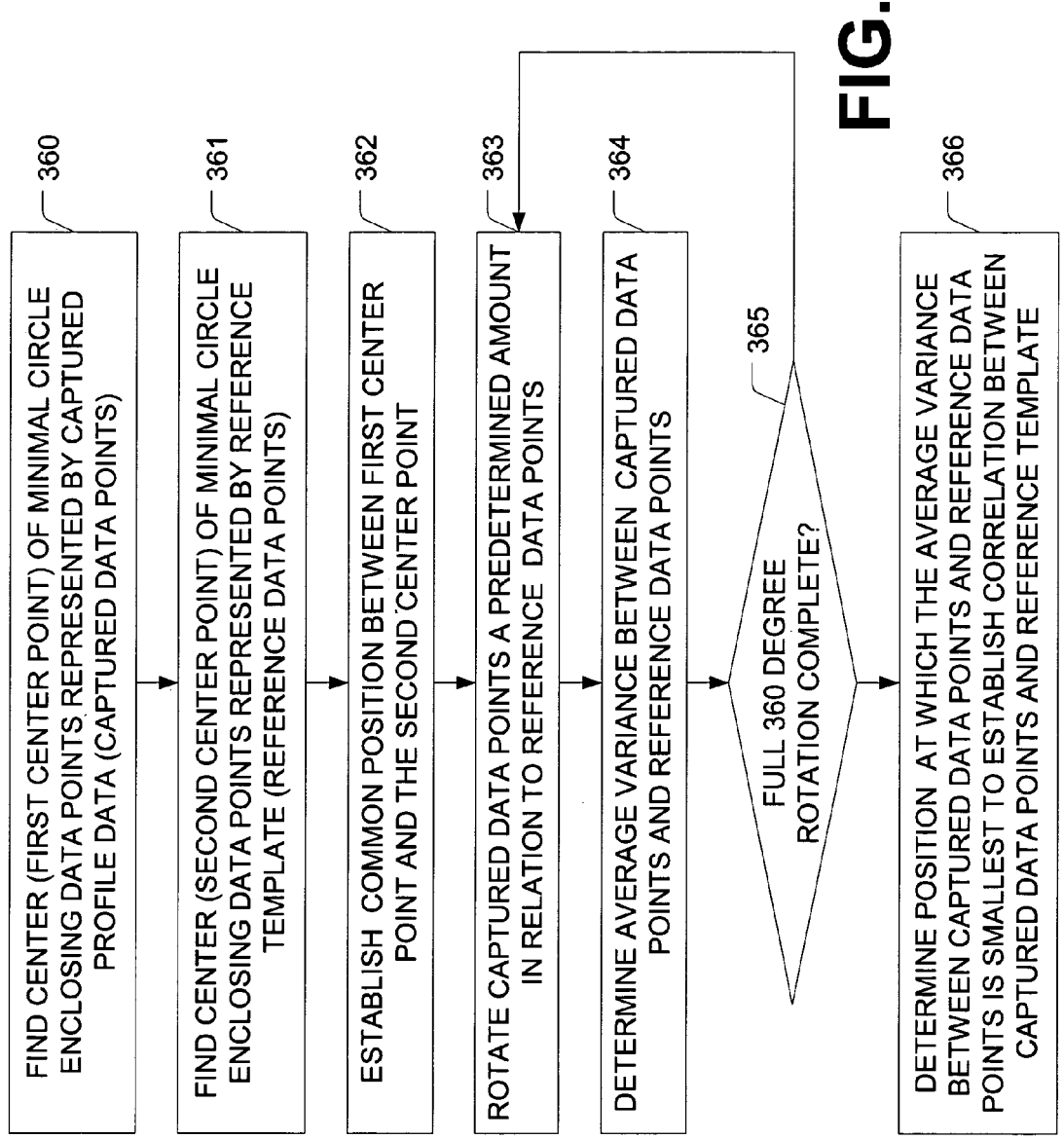
FIG. 3K is a flowchart illustrating a method of translating data to obtain a best match quality.

With reference to FIG. 3K the smallest circle that can enclose the data points represented by the captured profile data is determined and the center point of that circle (minimal enclosing circle) is determined (360). Similarly, the smallest circle that can enclose all of the data points represented by the reference template is determined. The center point of this circle is then determined (361). A common position is established between the center point of the circle enclosing the profile data points and the center point of the circle enclosing the reference template data points (362). The captured data points are then rotated in relation to the reference data points (363). Preferably they will be rotated a predetermined amount (step). The average variance (magnitude of the distance) between the captured data points and the reference profile will be determined (364). If the points have not been rotated a full 360° in relation to the reference data points, then the captured data points will again (365) be rotated a predetermined amount (363) and the average variance will again be determined at each point (364). This will continue until the points have been rotated a full 360° (365). In a preferred embodiment, the captured data points are rotated in 1° increments/steps and the average variance determined at each step. It will be recognized that any increment may be used as may be desired, however the more steps the greater the accuracy of the results. Once the rotation has been completed, a determination will be made as to which of the step positions provided the smallest average variance between captured data points and reference template data points (366). The correlation between the coordinate space of the captured profile and the reference template is then established and the captured profile may be compared with the reference template to determine whether it meets pre-established acceptance limits or tolerances. The precision of this correlation may be further increased by repeating the process over a more limited range, but with smaller steps.

Registration and Correlation

In order to allow for proper display of profile representations and to allow for accurate calculation and measurement functions to be carried out, it is necessary that the coordinate space defined by the 2-dimensional environment of each contour sensor 210, 212, 214 and 216 be correlated with the coordinate space of the sensor chassis 200. This correlation is established during a "registration" process.

Registration Module

The registration module 368 is configured to establish a correlation between a first coordinate space and a second coordinate space. More particularly, the registration module is configured to establish a correlation between the data representing a profile captured by each of the contour sensors (210, 212, 214 and/or 216) and a common coordinate space. This correlation is typically established during a registration mode, in which a known "target" (FIG. 4A and FIG. 4B) having known dimensions and characteristics is placed within the work zone 75 of the sensor chassis 200 and the profile thereof is captured. Based upon the captured profile data and known characteristics of the target a correlation is established between a first coordinate space and a second coordinate space which can subsequently be used to transform a given point to within the first coordinate space into a point within the second coordinate space.

Figure 3L:
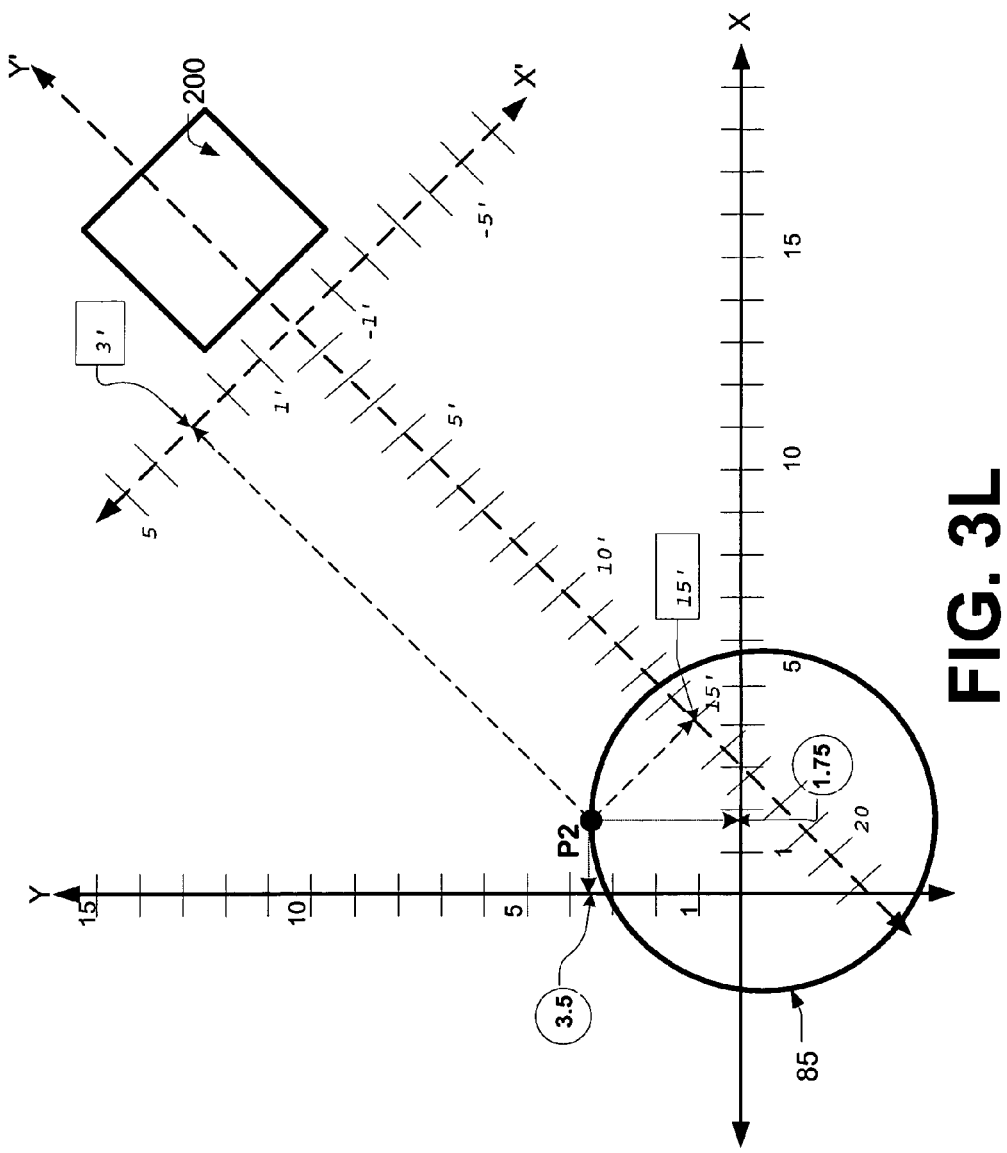
FIG. 3L is a diagram describing a correlation between a first coordinate space and a second coordinate space.

Profile data captured by each sensor unit 210 is described in terms of the coordinate space (sensor coordinate space) of the particular sensor unit. Since each sensor unit 210, 212, 214 and 216 is positioned and aligned differently with respect to the work zone 85, profile data generated by each sensor unit will be described in terms of the coordinate space relevant to the particular sensor unit. Thus, a coordinate value of, for example, (135, 72) output by sensor unit 210, will not correspond to the point described by a coordinate value (135, 72 output by sensor unit 214. This is illustrated in FIG. 3L where the point P2 can be seen to have a coordinate value of (1.75, 3.5) in the chassis space (defined by the X,Y axes) and a coordinate value of (3', 15') in the sensor space (defined by the X',Y' axes).

During the registration process, the registration module 368 carries out functions associated with establishing a correlation between a first coordinate space and a second coordinate space. The first coordinate space may be, for example, the coordinate space of the sensor unit (sensor coordinate space), while the second coordinate space may be a common coordinate space, such as the chassis coordinate space.

Figure 3M:
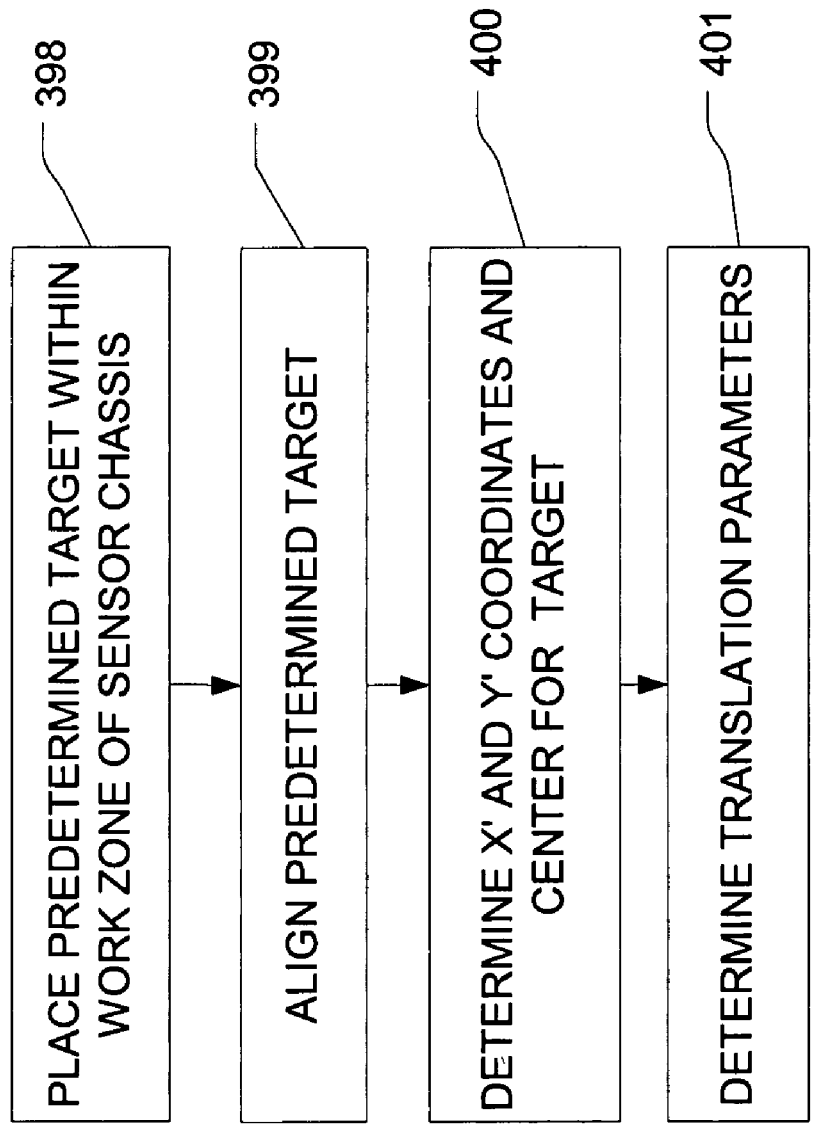
FIGS. 3M and FIG. 3N are is diagrams illustrating a method of registration of a sensor into coordinate space.
Figure 3N:
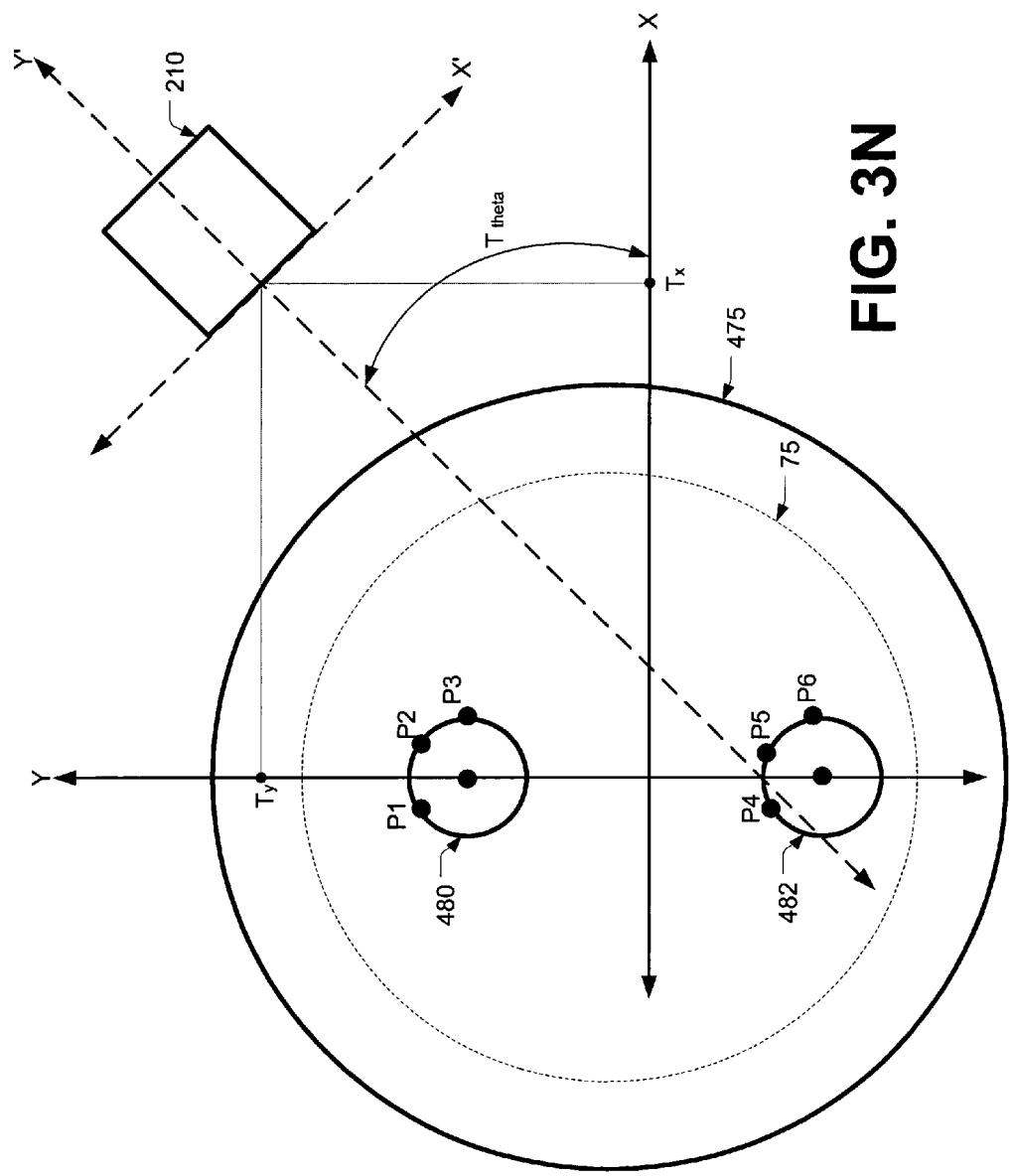

FIG. 3M is a flowchart illustrating a method of registration. In this process, a registration target is positioned within the work zone 75 of the sensor chassis 200 (398) (FIG. 4D). FIG. 4A and FIG. 4B are block diagrams illustrating a registration target 475. FIG. 4C is a diagram illustrating a registration target 475 positioned within a sensor chassis 200.

With reference to FIG. 3M, FIG. 3N, FIG. 4A, FIG. 4B, and FIG. 4C, the target 475 is aligned within the work zone 75 in a predetermined manner (399). In one embodiment shown in FIG. 4B, where the target is comprised of a first cylinder 480 and a second cylinder 482, the target 475 is aligned so that the centers of the two cylinders are aligned along one of the main axis's (Y axis) of the sensor chassis coordinate system. The coordinates in the sensor coordinate system for the centers of each cylinder 480 and 482 are determined (400). This is may be determined by performing a fit-to-circle regression on the data representing points (P1-P6) along the circumference of the cylinders 480 and 482. The angle of the line formed between the centers of cylinder 480 and 482 and the Y' axis of the sensor coordinate space is T theta. Translational parameters are then determined (401). The translational parameters may be determined by applying the rotational transform established by T theta to the coordinates of the center of cylinder 480 (CTR 1) and the cylinder 482 (CTR 2). The location of the midpoint between CTR 1 and CTR 2 has been rotated but not translated. This intermediate coordinate system can be considered to have an X" and Y" axis which are parallel to the X and Y axes of the chassis coordinate system. The x", y" values of the midpoint then correspond to Tx and Ty. The translation parameters may also be referred to as correlation data.

Correlation Module

The correlation module 364 is configured to translate or otherwise transform a point within a first coordinate space (such as the screen view of the contour sensor/sensor coordinate space) to a second (common) coordinate space based upon a pre-established relationship between the first coordinate space and the second coordinate space. In one example, the first coordinate space is the coordinate space of the sensor unit, while the second coordinate space is the coordinate space of the sensor chassis. The established relationship may be described by translational parameters such as those established during the registration process as described above with respect to FIG. 3L. In one embodiment, the translational parameters may be used to generate correlation data that may be stored into memory associated with the control unit 300 as, for example, a transform matrix or a look up table (LUT). This correlation data my then be used to determine a coordinate value in the second coordinate space for a given coordinate value from a first coordinate space.

FIG. 3O illustrates an embodiment of a control unit 300. In this embodiment, control 300 includes a processor 302, a local interface bus 304, storage memory 306 for storing electronic format instructions (software) 305 and data 308. Storage memory 306 may include both volatile and non-volatile memory. An input/output interface 340 may be provided for interfacing with and communicating data received from/to, for example, a network 114 or input devices such as a keyboard 320 or pointing device 325. Input/output interface 340 may also be configured to interface with, for example, graphics processor 345. Graphics processor 345 may be provided for carrying out the processing of graphic information for display in accordance with instructions from processor 302.

Processor 302 accesses data stored in memory 306 in accordance with, for example, software 305 stored on memory 306. Processor 302 may be configured to receive user input from an input device such as keyboard 320 or pointing device 325 and generate a command based upon the user input. Processor 302 may also be configured to place the command into a predetermined format, such as, for example, extensible mark-up language format, in accordance with software 905 stored in memory 916. Processor 302 may be further configured to forward the command to the sensor chassis 200 and to subsequently receive a response from the sensor chassis 200. The processor 302 may be further configured to carry out the functions of the visualization module 310, the video viewing module 311, reporting module 312 to and/or management module 313 in accordance with software 905 stored in memory 316. The software 305 may include, for example, one or more applications, configured to carry out various processes according to the methodology described by the flowcharts of FIGS. 3B, 3D, 3F, 3H, 3I, 3J and/or 3N.

In a preferred embodiment, the control unit 300 is configured to correlate a point within the coordinate system of the sensor chassis (chassis coordinate system) with a point in a sensor coordinate space. Further, the control unit 230 may be configured to provide for display of a representation of the chassis coordinate space and the profile of a detected work piece that is within the work zone 75.

Data representing the correlation between a first coordinate space and a second coordinate space (correlation data) may be stored locally on memory associated with the control unit 300, or remotely stored on memory accessible by the control unit 300 via a network 114. Control unit 300 is configured to receive user input and to issue commands to the sensor chassis 200. Commands may be issued by the control unit 300 based upon user input, or upon the occurrence of predetermined events/changes or other criteria.

The control unit 300 may be configured to request data from the sensor chassis 200. Similarly, the control unit 300 may be configured to receive video a data as well as coordinate data from the sensor chassis 200. The control unit 300 of the present invention can be implemented in hardware, software, firmware, or a combination thereof. In the preferred embodiment(s), the control unit 300 is implemented in software or firmware that is stored in a memory and that is executed by a suitable instruction execution system. If implemented in hardware, as in an alternative embodiment, the control system 300 can be implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

The flow charts of FIGS. 3B, 3D, 3F, 3H, 3I, 3J and/or 3N show the architecture, functionality, and operation of a possible implementation of the software 905 (FIG. 3O). In this regard, each block represents a module, segment, or portion of code, which comprises one or more executable instructions for implementing the specified logical function(s). It should also be noted that in some alternative implementations, the functions noted in the blocks may occur out of the order noted in the flowcharts. For example, two blocks shown in succession in the flowcharts may in fact be executed substantially concurrently or the blocks may sometimes be executed in the reverse order, depending upon the functionality involved. The software program stored as software 305, which comprises a listing of executable instructions (either ordered or non-ordered) for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (magnetic or non-magnetic), a read-only memory (ROM) (magnetic or non-magnetic), an erasable programmable read-only memory (EPROM or Flash memory), an optical fiber (optical), and a portable compact disc read-only memory (CDROM) (optical or magneto-optical). Note that the computer-readable is medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It will be recognized by those skilled in the art, that while certain aspects of the invention have been described in terms of hardware, it is possible and fully anticipated that such aspects can be implemented in software, and vice-a-versa. All such variations or implementations are fully contemplated by the present invention and are intended to full within the scope of the invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A measurement system comprising:
a sensor chassis configured to capture a substantially 360° profile of an object within a predetermined work zone
a control unit for receiving and processing data received from said sensor chassis;
said sensor chassis comprises a plurality of contour sensors, each substantially aligned with said work zone so that an object within said work zone is at least partially within the field of view (FOV) of each of said contour sensors;
each of said contour sensors is configured to generate and output data representative of at least a partial profile of an object within the contour sensors respective FOV;
the sensor chassis is further configured to allow for the capture of a substantially 360 profile of an object in the work zone without any part of the measurement system coming in contact with the object;
said control unit is further configured to correlate a coordinate space associated with at least two or more contour sensors with a common coordinate space, generate profile data representative of a substantially 360 profile of a predetermined object; and
the control unit is further configured to correlate the coordinate space associated with a reference template with said common coordinate space and to compare said profile data with said reference template to determine differences between said profile data and said reference template.

2. The measurement system of claim 1 wherein said contour sensors are aligned with said work zone, so as to allow for the collective capture of substantially a 360° view of the object within said work zone.

3. The measurement system of claim 1 wherein said contour sensors are aligned so as to allow for the collective capture of a substantially 360° view of an object within said work zone.

4. The measurement system of claim 3 wherein said contour sensors are substantially radially aligned with the center of said work zone.

5. The measurement system of claim 3 wherein said contour sensors are substantially radially aligned with the center of said work zone at 90° intervals about the work zone.

6. The measurement system of claim 1 wherein one or more of said contour sensors comprises an illumination unit configured to generate and output a light beam of a predetermined wavelength, and a detector unit responsive to light of said predetermined wavelength.

7. The measurement system of claim 1 wherein one or more of said contour sensors comprise a "sheet of light" contour sensor.

8. The measurement system of claim 1 wherein one or more of said contour sensors comprise a flying spot of light contour sensor.

9. The measurement system of claim 1 wherein said sensor chassis is configured to allow said contour sensors to be rotatably adjusted about said work zone.

10. The measurement system of claim 1 wherein said control unit comprises a visualization module for generating data to cause textual or graphical information to be displayed on an associated display device.

11. The measurement system of claim 1 wherein said control unit comprises a measurement module for carrying out a predetermined calculation.

12. The measurement system of claim 11 wherein said measurement module is further configured to calculate the distance between features of a profile based upon identified control points.

13. The measurement system of claim 11 wherein said measurement module is further configured to calculate an angle of a feature in a profile based upon two identified line segments.

14. The measurement system of claim 11 wherein said measurement module is further configured to determine variance between a profile and a predetermined profile reference.

15. The measurement system of claim 11 wherein said measurement module is further configured to determine the radius and center point of an arc.

16. The measurement system of claim 1 wherein said control unit further comprises a registration module for establishing a correlation between a first coordinate system and a second coordinate system.

17. The measurement system of claim 16 wherein said first coordinate system comprises a sensor coordinate system and said second coordinate system comprises a chassis coordinate system.

18. The system of claim 1 wherein said control unit is configured to determine the diameter of an object within the work zone.

19. The system of claim 18 wherein said control unit is further configured to determine a diameter of said work piece based upon application of a best fit of a circle of a known diameter to the points represented by said coordinate values.

20. The system of claim 19 wherein said control unit is configured to output data representing the value of said diameter.

21. The system of claim 1 wherein one or more of said contour sensors comprise a detector unit for receiving light reflected from an object within said work zone.

22. The system of claim 21 wherein one or more of said plurality of contour sensors is configured to generate data representing coordinate values for points along the profile of at least a portion of an object within a respective FOV based upon received light reflected from said object.

23. The system of claim 1 wherein said control unit is further configured to determine a center point of said work piece based upon application of a best fit of a circle of a known diameter to the points represented by said coordinate values.

24. The system of claim 23 wherein said control unit is configured to output data representative of the coordinate values for said center point.

25. The system of claim 1 wherein one or more of said contour sensors comprise a detection unit for receiving light reflected from said object.

26. The system of claim 25 wherein said detection unit comprises a charged coupled device (CCD).

27. The system of claim 1 wherein one or more of said contour sensors comprises an ultrasonic sensor responsive to ultrasonic radiation.

28. The system of claim 1 wherein one or more of said contour sensors comprises a detector unit responsive to radiation of a predetermined wavelength.

29. The measurement system of claim 28 wherein one or more of said contour sensors further comprises an emitter for emitting radiation of said predetermined wavelength.

30. The measurement system of claim 1 wherein one or more of said contour sensors comprises a stereo imaging sensor.

31. A measurement system comprising:
a sensor chassis configured to capture a substantially 360° profile of an object within a predetermined work zone;
a control unit for receiving and processing data received from said sensor chassis;
said sensor chassis comprises a plurality of contour sensors, each substantially aligned with said work zone so that an object within said work zone is at least partially within the field of view (FOV) of each of said contour sensors;
each of said contour sensors is configured to generate and output data representative of at least a partial profile of an object within the contour sensors respective FOV;
the sensor chassis is further configured to allow for the capture of a substantially 360 profile of an object in the work zone without any part of the measurement system coming in contact with the object; and—
said control unit is further configured to correlate a coordinate space associated with at least two or more contour sensors with a common coordinate space and generate profile data representative of a substantially 360° profile of the object in the work zone.

32. The method system of claim 31 wherein the control unit is further configured to correlate the coordinate space associated with a reference template with said common coordinate space; and
compare said profile data with said reference template to determine differences between said profile data and said reference template.

* * * * *